(12) United States Patent
Hasegawa et al.

(10) Patent No.: US 10,890,805 B2
(45) Date of Patent: Jan. 12, 2021

(54) LIQUID CRYSTAL DISPLAY DEVICE

(71) Applicant: SHARP KABUSHIKI KAISHA, Sakai (JP)

(72) Inventors: Masahiro Hasegawa, Osaka (JP); Akira Sakai, Osaka (JP); Takako Koide, Osaka (JP); Yuichi Kawahira, Osaka (JP); Koji Murata, Osaka (JP); Kiyoshi Minoura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/704,879

(22) Filed: Dec. 5, 2019

(65) Prior Publication Data
US 2020/0192165 A1  Jun. 18, 2020

Related U.S. Application Data

(60) Provisional application No. 62/778,689, filed on Dec. 12, 2018.

(51) Int. Cl.
*G02F 1/1335* (2006.01)
*G02F 1/13363* (2006.01)
*G02B 5/30* (2006.01)

(52) U.S. Cl.
CPC ..... *G02F 1/133634* (2013.01); *G02B 5/3083* (2013.01); *G02F 1/133528* (2013.01); *G02F 2001/133541* (2013.01)

(58) Field of Classification Search
CPC .................................................. G02F 1/1339
See application file for complete search history.

(56) References Cited

U.S. PATENT DOCUMENTS

| 2005/0231660 | A1* | 10/2005 | Fujita | G02B 5/3083 349/98 |
| 2007/0279553 | A1* | 12/2007 | Yoda | G02F 1/13363 349/96 |
| 2009/0257012 | A1* | 10/2009 | Sabae | G02B 5/3033 349/118 |
| 2013/0249378 | A1 | 9/2013 | Murakami et al. | |
| 2017/0160453 | A1* | 6/2017 | Kim | H01L 51/5281 |

FOREIGN PATENT DOCUMENTS

JP   2014-186351 A   10/2014

* cited by examiner

*Primary Examiner* — Sang V Nguyen
(74) *Attorney, Agent, or Firm* — ScienBiziP, P.C.

(57) ABSTRACT

A liquid crystal display device includes sequentially from a viewing surface side: a first polarizer; an out-cell retardation layer; a first substrate; an in-cell retardation layer; a horizontally aligned liquid crystal layer; a second substrate; and a second polarizer. The liquid crystal display device includes a viewing angle compensation film between the first polarizer and the out-cell retardation layer or between the second substrate and the second polarizer. The out-cell retardation layer is a laminate including sequentially from a viewing surface side: a first retardation layer having an NZ coefficient of 1.0-1.1 and an Re of 120 nm or greater and smaller than 137.5 nm; and a second retardation layer having an Re of 0-10 nm and an Rth of 80-150 nm. The in-cell retardation layer is a third retardation layer having an NZ coefficient of 0.7-1.4 and an Re of 120 nm or greater and smaller than 137.5 nm.

8 Claims, 15 Drawing Sheets

Isoluminance contour [nt]

Isoluminance contour [nt]

Isoluminance contour [nt]

Isoluminance contour [nt]

LIQUID CRYSTAL DISPLAY DEVICE

CROSS-REFERENCE TO RELATED APPLICATIONS

The present application claims priority under 35 U.S.C. § 119 to U.S. Provisional Application No. 62/778,689 filed on Dec. 12, 2018, the contents of which are incorporated herein by reference in their entirety.

BACKGROUND OF THE INVENTION

Field of the Invention

The present invention relates to liquid crystal display devices. The present invention specifically relates to a liquid crystal display device including a horizontally aligned liquid crystal layer.

Description of Related Art

Liquid crystal display devices use a liquid crystal composition for display. According to a typical display mode, voltage is applied to a liquid crystal composition sealed between a pair of substrates to change the alignment of liquid crystal molecules in the liquid crystal composition according to the applied voltage, whereby the amount of light transmitted is controlled. Such liquid crystal display devices have advantageous features such as thin profile, light weight, and low power consumption, and are thus used in a wide range of fields.

As a technique concerning an optical film used for liquid crystal display devices, for example, JP 2014-186351 A discloses a retardation film including a stretched polymer film and satisfying the following formulae (1) to (3):

$$0.70 < Re[450]/Re[550] < 0.97 \quad (1)$$

$$1.5 \times 10^{-3} < \Delta n < 6 \times 10^{-3} \quad (2)$$

$$1.13 < NZ < 1.50 \quad (3)$$

wherein Re[450] and Re[550] represent in-plane retardation values of the retardation film as measured at 23° C. using light with a wavelength of 450 nm and light with a wavelength of 550 nm, respectively; $\Delta n$ represents an in-plane birefringence equal to (nx−ny) (where nx and ny represent refractive indexes in a slow axis direction and a fast axis direction of the retardation film, respectively); and NZ represents a ratio of a thickness-direction birefringence equal to (nx−nz) (where nz represents a refractive index in a thickness direction of the retardation film) to the in-plane birefringence equal to (nx−ny).

BRIEF SUMMARY OF THE INVENTION

FIG. 12 is a schematic cross-sectional view of a liquid crystal display device of Comparative Embodiment 1. A liquid crystal display device 1R of Comparative Embodiment 1 is a fringe field switching (FFS) mode liquid crystal display device that is a kind of currently used horizontal alignment mode liquid crystal display devices, and includes in the following order from the viewing surface side, a first polarizer 1P, a transparent conductive film (e.g., indium tin oxide (ITO) thin film) 1SH, a first substrate 100, a horizontally aligned liquid crystal layer 1L, a second substrate 200, and a second polarizer 2P, as shown in FIG. 12. The first substrate 100 includes an insulating substrate 101, a color filter (CF) layer 102, and a black matrix layer 103 and is also referred to as a CF substrate. The second substrate 200 includes an insulating substrate 201 and thin-film transistors (TFTs) and is also referred to as a TFT substrate. The liquid crystal layer 1L is sealed with a sealant 1SE.

The liquid crystal display device 1R of Comparative Embodiment 1 causes poor recognition of a display image in a bright environment such as an outdoor environment, where the screen reflects excessively. As shown in FIG. 12, this poor recognition is mainly caused by: reflection of the first polarizer 1P surface, interface reflection of the black matrix layer 103 included in the first substrate 100, and interface reflection of the transparent conductive film 1SH that is disposed on a surface of the liquid crystal display device in order to prevent display defect caused by static electricity.

These interface reflections may be reduced by the following two methods. The first method is using an antireflection film 1RE for reducing the reflection of the first polarizer 1P surface. The second method is using a circularly polarizing plate produced by combining a λ/4 plate 20 and the first polarizer 1P for reducing the reflection of the interfaces of the transparent conductive film 1SH or of the black matrix layer 103.

FIG. 13 is a schematic cross-sectional view of a liquid crystal display device of Comparative Embodiment 2. The liquid crystal display device of Comparative Embodiment 2 can reduce the interface reflection by the above two methods. A liquid crystal display device 1R of Comparative Embodiment 2 has a structure in which the liquid crystal display device 1R of Comparative Embodiment 1 further includes an antireflection film and a λ/4 plate. In other words, the liquid crystal display device 1R of Comparative Embodiment 2 has the same structure as in the liquid crystal display device 1R of Comparative Embodiment 1 except for including a λ/4 plate 20 between the transparent conductive film 1SH and the first polarizer 1P and an antireflection film 1RE on the viewing surface side of the first polarizer 1P, as shown in FIG. 13.

When the λ/4 plate 20 is disposed in order to reduce the interface reflection, the retardation of the λ/4 plate 20 can be cancelled by further disposing a different λ/4 plate whose slow axis is perpendicular to that of the λ/4 plate 20. Conventionally, in a vertical alignment (VA) mode liquid crystal display device, a liquid crystal panel including a TFT substrate, a CF substrate, and a vertically aligned liquid crystal layer is sandwiched from the top and the bottom by two λ/4 plates whose slow axes are perpendicular to each other. Unfortunately, when this structure is applied to a horizontal alignment mode liquid crystal display device such as an FFS mode liquid crystal display device, whose liquid crystal molecules are always aligned in in-plane directions, the transmittance is constant at any alignment azimuth of the liquid crystal molecules, which fails to provide monochrome display. The FFS mode liquid crystal display device thus cannot employ the structure used in VA mode liquid crystal display devices. The term "vertical alignment mode" as used herein means a mode in which liquid crystal compounds (liquid crystal molecules) are aligned in a direction substantially perpendicular to the main surfaces of the pair of substrates with no voltage applied to the liquid crystal layer. The term "substantially perpendicular" herein means, for example, a state in which the pre-tilt angle of the liquid crystal compounds is at 85° or greater and 90° or smaller to the main surface of each substrate. The term "horizontal alignment mode" as used herein means a mode in which the liquid crystal compounds are aligned in a direction substantially parallel to the main surfaces of a pair of substrates with no voltage applied to the liquid crystal layer. The term "substantially parallel" as used herein means, for example, a state in which the pre-tilt angle of the liquid crystal compounds is at 0° or greater and 5° or smaller to the main surface of each substrate. The term "pre-tilt angle" as used herein means the angle of the major axis of a liquid crystal material (liquid crystal compounds) to the surface of each substrate when the voltage applied to the liquid crystal layer is below the threshold value (including the state with no voltage applied thereto). Here, the substrate surface is defined at 0° and a normal line to the substrate is defined at 90°.

FIG. 14 is a schematic cross-sectional view of a liquid crystal display device of Comparative Embodiment 3. FIG. 15 is an exploded schematic perspective view of the liquid crystal display device of Comparative Embodiment 3. In FIG. 15, the angles of the first and second polarizers each represent the azimuth angle of the absorption axis, the angles of the liquid crystal layer represent the alignment azimuths (of the slow axis) of the liquid crystal molecules in the white display state and in the black display state, and the angles of the other layers each represent the azimuth angle of the slow axis. A liquid crystal display device 1R of Comparative Embodiment 3 has the same structure as in the liquid crystal display device 1R of Comparative Embodiment 2 except for including: a positive A plate 22A that is a λ/4 plate between the liquid crystal layer 1L and the first substrate 100; and a positive A plate 21A and a positive C plate 21C that are λ/4 plates between the first polarizer 1P and the transparent conductive film 1SH in the stated order from the viewing surface side as shown in FIG. 14 and FIG. 15. The slow axis of the positive A plate 21A and the slow axis of the positive A plate 22A are perpendicular to each other. The laminate including the positive A plate 21A and the positive C plate 21C is also referred to as an out-cell retardation layer 21, and the positive A plate 22A is also referred to as an in-cell retardation layer 22.

In the liquid crystal display device 1R of Comparative Embodiment 3, the first polarizer 1P and the out-cell retardation layer 21 are used in combination to function as a circularly polarizing plate, which can cut the reflection of the transparent conductive film 1SH and the reflection of the black matrix layer 103. Also, the antireflection film 1RE can cut the reflection of the first polarizer 1P surface. Furthermore, since the slow axis of the out-cell retardation layer 21 and the slow axis of the in-cell retardation layer 22 are perpendicular to each other, at least in the front direction, the out-cell retardation layer 21 and the in-cell retardation layer 22 can cancel out the each other's retardations to achieve a state where the out-cell retardation layer 21 and the in-cell retardation layer 22 substantially do not exist. This structure resultantly provides transmissive display with similar optical properties to those of a typical FFS mode device while achieving low reflection. In the case where a pair of polarizers in the liquid crystal display device are disposed such that their absorption axes form an angle of about 90° when viewed from the viewing surface side, i.e., in the case where the pair of polarizers are arranged in the crossed Nicols, the absorption axes have axial dislocation from the crossed Nicols arrangement when viewed from an oblique direction. In order to correct this axial dislocation, a viewing angle compensation film is generally used in the field of liquid crystal display devices. Although the liquid crystal display device 1R of Comparative Embodiment 3 does not include such a viewing angle compensation film, a viewing angle compensation film may be disposed between the first polarizer 1P and the out-cell retardation layer 21 or between the second polarizer 2P and the second substrate 200.

When the positive A plate 22A is used as the in-cell retardation layer 22, the out-cell retardation layer 21 is preferably a uniaxial negative A plate (NZ=0) in order to cancel the retardation even when the device is viewed from an oblique direction. Unfortunately, use of the material of a negative A plate is difficult in terms of cost and hardness. Instead of the negative A plate, a laminate including the positive A plate 21A and the positive C plate 21C can be used, which can function as a negative A plate in appearance.

Here, a process is described in which the first polarizer 1P and the out-cell retardation layer 21 are combined into a circularly polarizing plate. In production of the circularly polarizing plate, the first polarizer 1P and the positive A plate 21A constituting the out-cell retardation layer 21 need to be bonded such that the absorption axis of the first polarizer 1P forms an angle of 45° (or 135°) with the slow axis of the positive A plate 21A. The absorption axis of the first polarizer 1P is along the machine direction of the film. Thus, when a film such as a cycloolefin polymer (COP) film is used as the positive A plate 21A constituting the out-cell retardation layer 21, the film is often formed by oblique stretching and has an NZ coefficient of about 1.6 in order to easily produce the circularly polarizing plate by directly bonding the film to a PVA film as the first polarizer 1P. However, as the NZ coefficient of the positive A plate 21A increases, the retardation of the in-cell retardation layer 22 when viewed from an oblique direction cannot be cancelled even when the positive C plate 21C has an optimal retardation value. This results in light leakage in the black display state when the device is viewed from an oblique direction. Furthermore, an increase in black luminance (a reduction in contrast ratio (CR) viewing angle) when the device is viewed from an oblique direction, which is caused by the increase in NZ coefficient, is greater in a liquid crystal display device with a viewing angle compensation film than in a liquid crystal display device without a viewing angle compensation film. Specific description of this is given below with reference to simulation results.

FIG. 16 is a schematic cross-sectional view of a liquid crystal display device of Comparative Embodiment 3-1. FIG. 17 is a simulation result of the transmittance in the black display state of the liquid crystal display device of Comparative Embodiment 3-1, illustrating luminance contour lines (black transmittance chart) in the black display state within the azimuth angle range of 0° to 360° and the polar angle range of 0° to 80°. FIG. 18 is a graph of the simulation result of the transmittance in the black display state of the liquid crystal display device of Comparative Embodiment 3-1, showing the transmittance in the black display state at a polar angle of 60° within the azimuth angle range of 0° to 360°. In the schematic cross-sectional views of the comparative embodiments, the angles of the first and second polarizers each represent the azimuth angle of the absorption axis of the polarizer, the angle of the liquid crystal layer represents the alignment azimuth of the liquid crystal molecules in the black display state, and the angles of the other layers each represent the azimuth angle of the slow axis.

In a liquid crystal display device 1R of Comparative Embodiment 3-1 having the structure as shown in FIG. 16, the transmittance viewing angle in the black display state was simulated within the azimuth angle range of 0° to 80° and the azimuth angle φ range of 0° to 360°. FIG. 17 shows the result. In the liquid crystal display device 1R of Comparative Embodiment 3-1 having the structure as shown in FIG. 16, the transmittance in the black display state was simulated at a polar angle θ of 60° within the azimuth angle φ range of 0° to 360°. FIG. 18 shows the result. The simulations herein were performed with an LCD-Master available from Shintec Co., Ltd. The liquid crystal display device 1R of Comparative Embodiment 3-1 had an average transmittance value in the black display state of 0.80 at a polar angle θ of 60°. The average transmittance value in the black display state is the average of transmittance values in the black display state determined for every 5° within the azimuth angle range of 0° to 360°. Hereinafter, the transmittance in the black display state is also simply referred to as "black transmittance".

FIG. 19 is a simulation result of the transmittance in the black display state of a liquid crystal display device of Comparative Embodiment 3-2, illustrating luminance contour lines (black transmittance chart) in the black display state within the azimuth angle range of 0° to 360° and the polar angle range of 0° to 80°. FIG. 20 is a graph of the simulation result of the transmittance in the black display state of the liquid crystal display device of Comparative Embodiment 3-2, showing the transmittance in the black display state at a polar angle of 60° within the azimuth angle range of 0° to 360°. In a liquid crystal display device 1R of Comparative Embodiment 3-2 having the same structure as in Comparative Embodiment 3-1 except that the NZ coefficient of the positive A plate 21A is changed to 1.6, the transmittance in the black display state was simulated in the same manner as in Comparative Embodiment 3-1. FIG. 19 and FIG. 20 show the results. The liquid crystal display device 1R of Comparative Embodiment 3-2 had an average black transmittance value of 0.97 at a polar angle θ of 60°.

FIG. 21 is a schematic cross-sectional view of a liquid crystal display device of Comparative Embodiment 4-1. FIG. 22 is a simulation result of the transmittance in the black display state of the liquid crystal display device of Comparative Embodiment 4-1, illustrating luminance contour lines (black transmittance chart) in the black display state within the azimuth angle range of 0° to 360° and the polar angle range of 0° to 80°. FIG. 23 is a graph of the simulation result of the transmittance in the black display state of the liquid crystal display device of Comparative Embodiment 4-1, showing the transmittance in the black display state at a polar angle of 60° within the azimuth angle range of 0° to 360°. As shown in FIG. 21, the liquid crystal display device 1R of Comparative Embodiment 4-1 has the same structure as in the liquid crystal display device 1R of Comparative Embodiment 3-1 except for including a viewing angle compensation layer 11 as the viewing angle compensation film between the first polarizer 1P and the out-cell retardation layer 21. The viewing angle compensation layer 11 is a laminate including a positive A plate 11A and a positive C plate 11C in the stated order from the first polarizer 1P side. In a liquid crystal display device 1R of Comparative Embodiment 4-1, the transmittance in the black display state was simulated in the same manner as in Comparative Embodiment 3-1. FIG. 22 and FIG. 23 show the results. The liquid crystal display device 1R of Comparative Embodiment 4-1 had an average black transmittance value of 0.12 at a polar angle θ of 60°.

FIG. 24 is a simulation result of the transmittance in the black display state of the liquid crystal display device of Comparative Embodiment 4-2, illustrating luminance contour lines (black transmittance chart) in the black display state within the azimuth angle range of 0° to 360° and the polar angle range of 0° to 80°. FIG. 25 is a graph of the simulation result of the transmittance in the black display state of the liquid crystal display device of Comparative Embodiment 4-2, showing the transmittance in the black display state at a polar angle of 60° within the azimuth angle range of 0° to 360°. In a liquid crystal display device 1R of Comparative Embodiment 4-2 having the same structure as in Comparative Embodiment 4-1 except that the NZ coefficient of the positive A plate 21A included in the out-cell retardation layer 21 is changed to 1.6, the transmittance in the black display state was simulated. FIG. 24 and FIG. 25 show the results. The liquid crystal display device 1R of Comparative Embodiment 4-2 had an average black transmittance value of 0.31 at a polar angle θ of 60°.

As shown in Comparative Embodiments 3-1 and 3-2, when no viewing angle compensation layer 11 was disposed, the average black transmittance value of the liquid crystal display device of Comparative Embodiment 3-2, which included the positive A plate 21A having an NZ coefficient of 1.6, was 1.21 times that of the liquid crystal display device of Comparative Embodiment 3-1, which included the positive A plate 21A having an NZ coefficient of 1.0. The liquid crystal display device of Comparative Embodiment 3-2 fell within the allowable range through subjective evaluation although the average black transmittance value and the black luminance when viewed from an oblique direction were higher than those in Comparative Embodiment 3-1. These indicate that the upper limit of the average black transmittance value of a liquid crystal display device is 1.25 times the average black transmittance value of a liquid crystal display device having an NZ coefficient of 1.0.

Meanwhile, as shown in Comparative Embodiments 4-1 and 4-2, when the viewing angle compensation layer 11 was disposed, the average black transmittance value of the liquid crystal display device of Comparative Embodiment 4-2, which included the positive A plate 21A having an NZ coefficient of 1.6, was 2.5 times that of the liquid crystal display device of Comparative Embodiment 4-1, which included the positive A plate 21A having an NZ coefficient of 1.0. The liquid crystal display device failed to fall within the allowable range through subjective evaluation.

As described, an increase in black luminance when the device is viewed from an oblique direction, which is caused by the increase in NZ coefficient, is greater in a liquid crystal display device with the viewing angle compensation layer 11 than in a liquid crystal display device without the viewing angle compensation layer 11.

JP 2014-186351 A discloses that limiting the range of parameters such as the NZ coefficient of a retardation film including a stretched polymer film achieves a retardation film excellent in driving property, processability, and product reliability. Unfortunately, JP 2014-186351 A discloses no studies about a technique of reducing light leakage in the black display state when viewed from an oblique direction in a liquid crystal display device that includes an in-cell retardation layer, an out-cell retardation layer, and a viewing angle compensation film.

The present invention has been made under the current situation in the art and aims to provide a liquid crystal display device that is easily producible and is capable of reducing reflection of external light and reducing light leakage in the black display state when viewed from an oblique direction.

(1) An aspect of the present invention is a liquid crystal display device including in the following order from a viewing surface side: a first polarizer; an out-cell retardation layer; a first substrate; an in-cell retardation layer; a horizontally aligned liquid crystal layer; a second substrate; and a second polarizer, the liquid crystal display device further comprising a viewing angle compensation film between the first polarizer and the out-cell retardation layer or between the second substrate and the second polarizer, the out-cell retardation layer being a laminate including in the following order from a viewing surface side: a first retardation layer having an NZ coefficient of 1.0 or greater and 1.1 or smaller and an in-plane retardation of 120 nm or greater and smaller than 137.5 nm; and a second retardation layer having an in-plane retardation of 0 nm or greater and 10 nm or smaller and a thickness retardation of 80 nm or greater and 150 nm or smaller, the in-cell retardation layer being a third retardation layer having an NZ coefficient of 0.7 or greater and 1.4 or smaller and an in-plane retardation of 120 nm or greater and smaller than 137.5 nm.

(2) In an embodiment of the present invention, the liquid crystal display device includes the structure (1) and the first retardation layer has an in-plane retardation of 135 nm or smaller.

(3) In an embodiment of the present invention, the liquid crystal display device includes the structure (1) or (2), and the viewing angle compensation film is disposed between the first polarizer and the out-cell retardation layer, and the in-plane retardation of the first retardation layer Re(A1), the NZ coefficient of the first retardation layer NZ(A1), and the thickness retardation of the second retardation layer Rth(C1) satisfy a relation expressed by the following Formula 1:

$$P-10 \leq Rth(C1) \leq P+10 \quad \text{(Formula 1)}$$

wherein P satisfies a relation expressed by the following Formula P1:

$$P=Re(A1)-(Re(A1)/NZ(A1)-95)-(120-Re(A1)) \quad \text{(Formula P1)}.$$

(4) In an embodiment of the present invention, the liquid crystal display device includes the structure (1) or (2), and the viewing angle compensation film is disposed between the second substrate and the second polarizer, and the in-plane retardation of the first retardation layer Re(A1), the NZ coefficient of the first retardation layer NZ(A1), and the thickness retardation of the second retardation layer Rth(C1) satisfy a relation expressed by the following Formula 2:

$$Q-10 \leq Rth(C1) \leq Q+10 \quad \text{(Formula 2)}$$

wherein Q satisfies a relation expressed by the following Formula Q1:

$$Q=Re(A1)-(Re(A1)/NZ(A1)-100)-(120-Re(A1))\times(NZ(A1)-1.0)\times100 \quad \text{(Formula Q1)}.$$

(5) In an embodiment of the present invention, the liquid crystal display device includes the structure (1), (2), (3), or (4), and the viewing angle compensation film is a laminate including: a retardation layer having an NZ coefficient of 0.7 or greater and 1.3 or smaller and an in-plane retardation of 130 nm or greater and 150 nm or smaller; and a retardation layer having an in-plane retardation of 0 nm or greater and 10 nm or smaller and a thickness retardation of 80 nm or greater and 100 nm or smaller.

(6) In an embodiment of the present invention, the liquid crystal display device includes the structure (1), (2), (3), or (4), and the viewing angle compensation film is a laminate including: a biaxial retardation layer having an NZ coefficient of 1.3 or greater and 1.5 or smaller and an in-plane retardation of 80 nm or greater and 100 nm or smaller; and a biaxial retardation layer having an NZ coefficient of −1.2 or greater and −0.8 or smaller and an in-plane retardation of 50 nm or greater and 70 nm or smaller.

(7) In an embodiment of the present invention, the liquid crystal display device includes the structure (1), (2), (3), or (4), and the viewing angle compensation film is a laminate including: a biaxial retardation layer having an NZ coefficient of 1.1 or greater and 1.3 or smaller and an in-plane retardation of 100 nm or greater and 130 nm or smaller, and a biaxial retardation layer having an NZ coefficient of −4.5 or greater and −3.5 or smaller and an in-plane retardation of 10 nm or greater and 30 nm or smaller.

(8) In an embodiment of the present invention, the liquid crystal display device includes the structure (1), (2), (3), or (4), and the viewing angle compensation film is a retardation layer having an NZ coefficient of 0.4 or greater and 0.6 or smaller and an in-plane retardation of 230 nm or greater and 320 nm or smaller.

(9) In an embodiment of the present invention, the liquid crystal display device includes the structure (1), (2), (3), (4), (5), (6), (7), or (8), the display device further includes an antireflection film on a viewing surface side of the first polarizer, and the antireflection film has a minimum visible light reflectance within a wavelength range of 550 nm or greater and 780 nm or smaller.

The present invention can provide a liquid crystal display device that is easily producible and is capable of reducing reflection of external light and reducing light leakage in the black display state when viewed from an oblique direction.

DETAILED DESCRIPTION OF THE INVENTION

Figure 1:
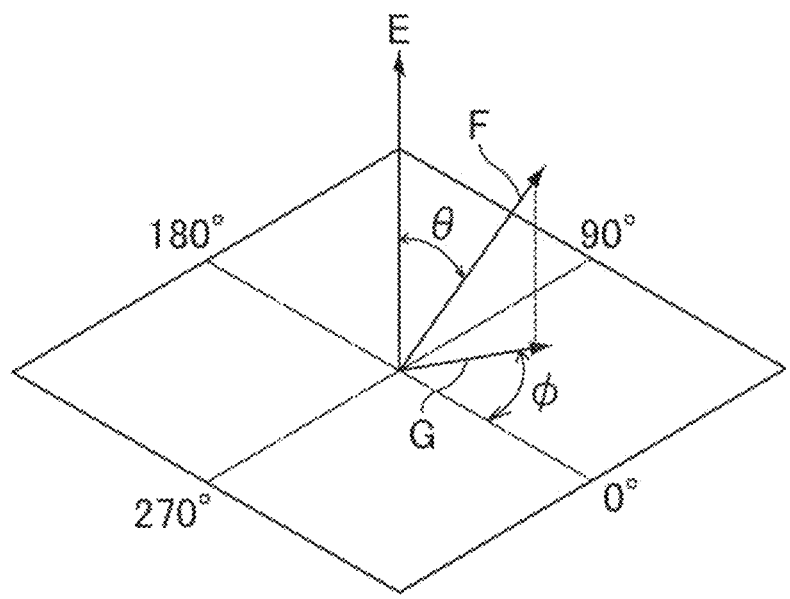
FIG. 1 is a figure for illustrating the definitions of a polar angle and an azimuth angle in a liquid crystal display device.

Liquid crystal display devices of embodiments of the present invention are described below. The embodiments, however, are not intended to limit the scope of the present invention, and modifications can be appropriately made to the design within the scope of the present invention. Features described in the embodiments may appropriately be combined or modified within the spirit of the present invention.

Definitions of Terms and Symbols

Definitions of terms and symbols used herein are as follows.

(1) Refractive Index ($n_x$, $n_y$, $n_z$)

The refractive index "$n_x$" represents the refractive index in the direction at which the in-plane refractive index is maximum (i.e., slow axis direction). The refractive index "$n_y$" represents the refractive index in the direction perpendicular to the slow axis in a plane. The refractive index "$n_z$" represents the refractive index in the thickness direction. The refractive indices herein each indicate the value to light with a wavelength of 550 nm at 23° C., unless otherwise stated.

(2) In-Plane Retardation (Re)

The in-plane retardation (Re) herein indicates the in-plane retardation of a layer (film) to light with a wavelength of 550 nm at 23° C., unless otherwise stated. Re is determined by $Re=(n_x-n_y)\times d$, wherein d is the thickness (nm) of the layer (film).

(3) Thickness Retardation (Rth)

The thickness retardation (Rth) herein indicates the thickness retardation of a layer (film) to light with a wavelength of 550 nm at 23° C., unless otherwise stated. Rth is determined by $Rth=\{(n_x+n_y)/2-n_z\}\times d$, wherein d is the thickness (nm) of the layer (film).

(4) NZ Coefficient

The NZ coefficient is determined by $NZ=(n_x-n_z)/(n_x-n_y)$ and is a value showing the ratio between two axes of a retardation layer.

(5) λ/4 Plate

The λ/4 plate means a retardation layer that provides an in-plane retardation of ¼ wavelength (137.5 nm, precisely) to at least light having a wavelength of 550 nm, and may be a retardation layer that provides an in-plane retardation of 100 nm or greater and 176 nm or smaller. Light having a wavelength of 550 nm is light of a wavelength at which a human has the highest visual sensitivity.

(6) λ/2 Plate

The λ/2 plate means a retardation layer that provides an in-plane retardation of ½ wavelength (275 nm, precisely) to at least light having a wavelength of 550 nm, and may be a retardation layer that provides an in-plane retardation of 230 nm or greater and 320 nm or smaller.

(7) Circularly Polarizing Plate

The circularly polarizing plate is a polarizing plate that converts incident unpolarized light into circularly polarized light. The circularly polarized light herein encompasses not only perfectly circularly polarized light (ellipticity (minor axis/major axis)=1.00) but also elliptically polarized light having an ellipticity of 0.90 or greater and smaller than 1.00 to at least light having a wavelength of 550 nm.

(8) Viewing Surface Side and Back Surface Side

The viewing surface side means the side closer to the screen (display surface) of a liquid crystal display device. The back surface side means the side remote from the screen (display surface) of a liquid crystal display device.

(9) Polarizer

The "polarizer" without "linear" herein means a linear polarizer, which is distinguished from a circular polarizer (circularly polarizing plate).

(10) Polar Angle, Azimuth, Azimuth Angle

FIG. 1 is a figure for illustrating the definitions of a polar angle and an azimuth angle in a liquid crystal display device. As shown in FIG. 1, with the normal direction E of a liquid crystal display device made as a reference, the polar angle θ is an angle formed by the measurement direction F and the normal direction E and is usually 0° or greater and 90° or smaller. The direction G that is a projection of the measurement direction F is defined as the azimuth, which is usually at 0° or greater and 360° or smaller. The angle from a reference direction on the screen (azimuth angle) 0° to the direction G is defined as the azimuth angle φ. The azimuth angle φ is defined to be positive in the counterclockwise direction and to be negative in the clockwise direction. The terms counterclockwise and clockwise each indicate a direction when the screen is viewed from the viewing surface side (front). The polar angle θ is also simply referred to as a polar angle. The azimuth angle φ is also simply referred to as an azimuth angle and is defined with the horizontal direction of the screen as a reference (0°).

Embodiment 1

Figure 2:
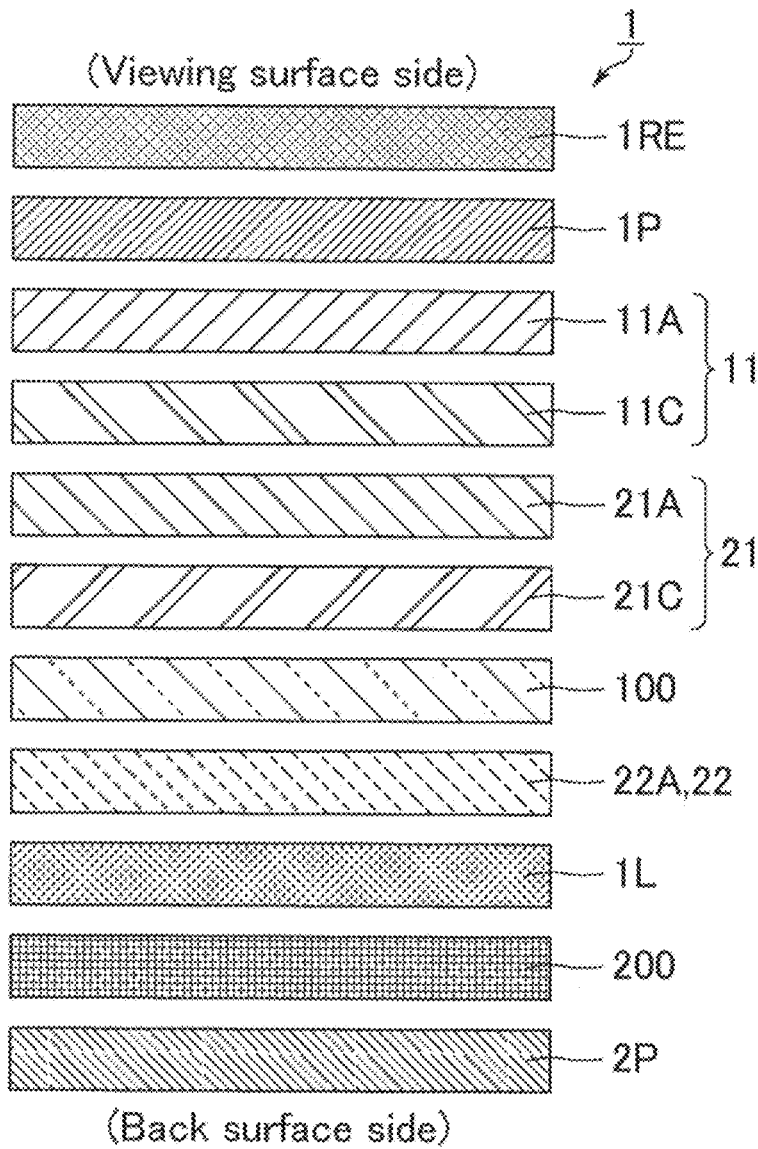
FIG. 2 is a schematic cross-sectional view of a liquid crystal display device of Embodiment 1.

FIG. 2 is a schematic cross-sectional view of a liquid crystal display device of Embodiment 1. A liquid crystal display device 1 of the present embodiment includes, in the following order from the viewing surface side, a blue antireflection film 1RE as the antireflection film, the first polarizer 1P, the viewing angle compensation layer 11, the out-cell retardation layer 21, the first substrate 100, the in-cell retardation layer 22, the horizontally aligned liquid crystal layer 1L, the second substrate 200, and the second polarizer 2P. The viewing angle compensation layer 11 is a laminate including: the positive A plate 11A as the retardation layer, having an NZ coefficient of 0.7 or greater and 1.3 or smaller and an in-plane retardation of 130 nm or greater and 150 nm or smaller; and the positive C plate 11C as the retardation layer, having an in-plane retardation of 0 nm or greater and 10 nm or smaller and a thickness retardation of 80 nm or greater and 100 nm or smaller, in the stated order from the first polarizer 1P side. The out-cell retardation layer 21 is a laminate including: the positive A plate 21A as the first retardation layer, having an NZ coefficient of 1.0 or greater and 1.1 or smaller and an in-plane retardation of 120 nm or greater and smaller than 137.5 nm; and the positive C plate 21C as the second retardation layer, having an in-plane retardation of 0 nm or greater and 10 nm or smaller and a thickness retardation of 80 nm or greater and 150 nm or smaller, in the stated order from the first polarizer 1P side. The in-cell retardation layer 22 is the positive A plate 22A as the third retardation layer, having an NZ coefficient of 0.7 or greater and 1.4 or smaller and an in-plane retardation of 120 nm or greater and smaller than 137.5 nm. The positive A plates 21A and 22A are λ/4 plates.

The first substrate 100 includes, in the following order from the viewing surface side, an insulating substrate formed from a transparent material such as glass and a color filter (CF) layer. The CF layer includes color filters and a black matrix. The color filters include, for example, red color filters, green color filters, and blue color filters. The first substrate 100 is also referred to as a CF substrate.

The second substrate 200 includes, in the following order toward the liquid crystal layer 1L, an insulating substrate, scanning lines, data lines, thin film transistors (TFTs) connected to the scanning lines and the data lines, and an electrode layer. The electrode layer includes, in the following order toward the liquid crystal layer 1L, a planar common electrode, an insulating film, and pixel electrodes with slits. The positions of the common electrode and the pixel electrodes may be switched, and a common electrode with slits may be formed on the liquid crystal layer 1L side of planar pixel electrodes. The second substrate 200 is also referred to as a TFT substrate.

The pixel electrodes each have a potential in accordance with a data signal supplied through the corresponding TFT. A fringe electric field is generated between the pixel electrodes and the common electrode to rotate liquid crystal molecules in the liquid crystal layer. The voltage applied between the pixel electrodes and the common electrode is controlled to change the retardation of the liquid crystal layer, whereby light is controlled to be transmitted or not transmitted. The liquid crystal display device 1 of the present embodiment is a fringe field switching (FFS) mode liquid crystal display device.

Although the present embodiment exemplifies a FFS mode liquid crystal display device 1, the present embodiment may be applied to an in-plane switching (IPS) mode liquid crystal display device in which each of pixel electrodes as comb-teeth electrodes and a common electrode as a comb-teeth electrode are formed on the same electrode layer such that their comb teeth fit each other.

The absorption axis of the first polarizer 1P is set to form an angle of about 90° with the absorption axis of the second polarizer 2P. This structure achieves a suitable black display state with no voltage applied (when the voltage applied to the liquid crystal layer is less than the threshold value).

The first polarizer 1P and the second polarizer 2P may each be any polarizer appropriate for the object. Examples thereof include: those obtained by adsorbing a dichroic substance (dichroic pigment), such as iodine or a dichroic dye, to a hydrophilic polymer film, such as a polyvinyl alcohol film, a partially formalized polyvinyl alcohol film, or an ethylene-vinyl acetate copolymer-based partially saponified film, and uniaxially stretching the film; and polyene-based alignment films such as a dehydrated product of polyvinyl alcohol and a dehydrochlorinated product of polyvinyl chloride. Particularly preferred among these is a polarizer obtained by adsorbing a dichroic substance (dichroic pigment) such as iodine to a polyvinyl alcohol film and uniaxially stretching the film because such a polarizer has a high polarized dichroic ratio. The thickness of such a polarizer is not limited and may usually be about 5 to 30 μm.

In the case where the liquid crystal display device 1 including the horizontally aligned liquid crystal layer 1L includes the first polarizer 1P and the second polarizer 2P with their absorption axes arranged to form an angle of about 90° when viewed from the viewing surface side, i.e., in the case where the first polarizer 1P and the second polarizer 2P are arranged in the crossed Nicols, the absorption axes have axial dislocation from the crossed Nicols arrangement when viewed from an oblique direction. In order to correct this axial dislocation, the liquid crystal display device 1 of the present embodiment is provided with a viewing angle compensation film generally used in the field of liquid crystal display devices as the viewing angle compensation layer 11. The viewing angle compensation film, even when viewed from an oblique direction, can change the polarization state of linearly polarized light having passed through one of paired polarizers arranged in the crossed Nicols such that the linearly polarized light is polarized in the direction parallel to the absorption axis of the other polarizer. The viewing angle compensation film may be used in both of a liquid crystal display device including a horizontally aligned liquid crystal layer and a liquid crystal display device including a vertically aligned liquid crystal layer. The horizontally aligned liquid crystal layer means a liquid crystal layer in which liquid crystal molecules align in the direction substantially parallel to the main surface of each of paired substrates with no voltage applied. The expression substantially parallel means, for example, that the tilt angle of liquid crystal molecules is 0° or greater and 5° or smaller to the main surface of each substrate. The tilt angle of liquid crystal molecules means an angle of inclination of the major axes (optical axes) of liquid crystal molecules to the surface of a substrate. A liquid crystal display device including a horizontally aligned liquid crystal layer is also referred to as a horizontal alignment mode liquid crystal display device. The vertically aligned liquid crystal layer means a liquid crystal layer in which liquid crystal molecules align in the direction substantially perpendicular to the main surface of each of paired substrates with no voltage applied. The expression substantially perpendicular means, for example, that the tilt angle of liquid crystal molecules is 85° or greater and 90° or smaller to the main surface of each substrate. A liquid crystal display device including a vertically aligned liquid crystal layer is also referred to as a vertical alignment mode liquid crystal display device.

In the present embodiment, the out-cell retardation layer 21 is disposed in combination with the first polarizer 1P to function as a circularly polarizing plate, which can reduce reflection of external light. Accordingly, the slow axis of the positive A plate 21A that is a λ/4 plate is set to form an angle of about 45° (or about 135°) with the absorption axis of the first polarizer 1P.

The slow axis of the positive A plate 22A that is a λ/4 plate is set to form an angle of about 90° with the slow axis of the positive A plate 21A. Thereby, at least in the front direction, the out-cell retardation layer 21 and the in-cell retardation layer 22 can cancel out the each other's in-plane retardations to achieve a state where the out-cell retardation layer 21 and the in-cell retardation layer 22 substantially do not exist. This structure resultantly provides transmissive display with similar optical properties to those of a typical FFS mode device while achieving low reflection. In order to cancel the retardation of the in-cell retardation layer 22 formed from the positive A plate 22A at all the azimuths, the out-cell retardation layer 21 may be formed from a negative A plate. Unfortunately, materials for the negative A plate tend to be torn, i.e., are fragile. The liquid crystal display device 1 of the present embodiment employs a laminate including the positive A plate 21A and the positive C plate 21C as the out-cell retardation layer 21 so that the out-cell retardation layer 21 works as a negative A plate in appearance, which can prevent deterioration in fragileness of the out-cell retardation layer 21.

In the process in which a first polarizer and an out-cell retardation layer are combined into a circularly polarizing plate, the first polarizer and a positive A plate constituting the out-cell retardation layer need to be bonded such that the absorption axis of the first polarizer forms an angle of about 45° (or about) 135° with the slow axis of the positive A plate. The absorption axis of the first polarizer is along the machine direction of the film. Thus, when a film such as a COP film is used as the positive A plate constituting the out-cell retardation layer, a film formed by oblique stretching and having an NZ coefficient of about 1.6 is often used in order to achieve direct bonding of the film to a PVA film as the first polarizer. However, as the NZ coefficient of the positive A plate in the out-cell retardation layer increases, the retardation of the in-cell retardation layer when viewed from an oblique direction cannot be cancelled even when the positive C plate in the out-cell retardation layer has an optimal retardation value. This results in light leakage in the black display state when the device is viewed from an oblique direction. Furthermore, an increase in black luminance (a reduction in CR viewing angle) when the device is viewed from an oblique direction, which is caused by the increase in NZ coefficient, is greater in a liquid crystal display device with a viewing angle compensation layer than in a liquid crystal display device without a viewing angle compensation layer.

Accordingly, in the present embodiment, the NZ coefficient of the positive A plate 21A of the out-cell retardation layer 21 is set to 1.0 or greater and 1.1 or smaller. This can reduce light leakage in the black display state when the device is viewed from an oblique direction.

The in-plane retardation of the positive A plate 21A is set to smaller than 137.5 nm. This enables stable production of the positive A plate 21A by oblique stretching. As a result, the positive A plate 21A and the first polarizer 1P can be directly bonded such that the absorption axis of the first polarizer 1P forms an angle of about 45° (or about 135°) with the slow axis of the positive A plate 21A, which enables easy production of the liquid crystal display device 1. The following describe the details.

Figure 3:
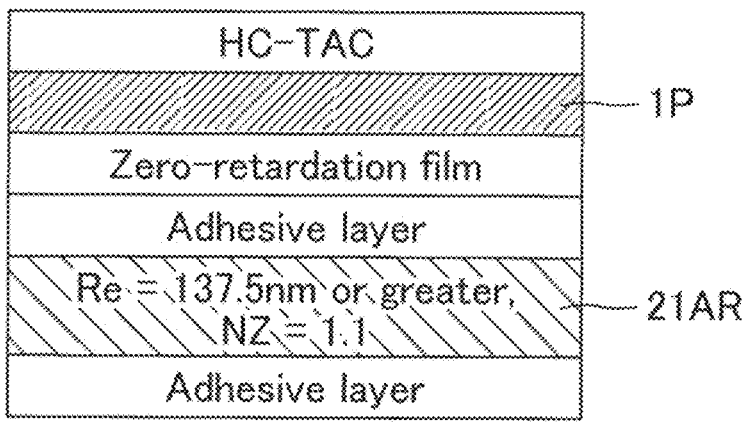
FIG. 3 is a schematic cross-sectional view of an exemplary circularly polarizing plate produced by sheet lamination.
Figure 4:
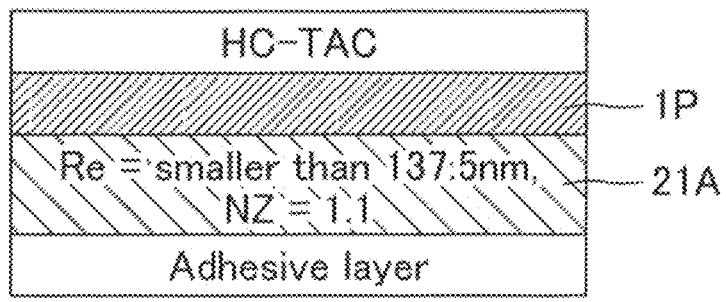
FIG. 4 is a schematic cross-sectional view of an exemplary circularly polarizing plate produced by roll to roll lamination.

FIG. 3 is a schematic cross-sectional view of an exemplary circularly polarizing plate produced by sheet lamination. FIG. 4 is a schematic cross-sectional view of an exemplary circularly polarizing plate produced by roll to roll lamination. The "HC-TAC" in FIGS. 3 and 4 means a film that includes a hard coat layer on one surface of a triacetylcellulose (TAC) film. When the positive A plate of the out-cell retardation layer has an in-plane retardation of 137.5 nm or greater and an NZ coefficient of 1.0 or greater and 1.1 or smaller, stable production of the positive A plate by oblique stretching is difficult. Accordingly, as shown in FIG. 3, the first polarizer 1P held between the HC-TAC and the zero-retardation film and a positive A plate 21AR having an in-plane retardation of 137.5 nm or greater need to be bonded by sheet lamination with an adhesive layer. In contrast, as described in the present embodiment, when the positive A plate 21A of the out-cell retardation layer 21 has an in-plane retardation of smaller than 137.5 nm and an NZ coefficient of 1.0 or greater and 1.1 or smaller, the positive A plate 21A can be produced by oblique stretching. Accordingly, as shown in FIG. 4, the first polarizer 1P and the positive A plate 21A can be directly bonded with a bonding layer (not shown) by roll to roll lamination. Thus, the circularly polarizing plate can be produced more easily than the case where the circularly polarizing plate is produced by sheet lamination. The circularly polarizing plate produced by roll to roll lamination has a smaller number of layers to be laminated than the circularly polarizing plate produced by sheet lamination, which can reduce the thickness of the circularly polarizing plate as a whole. Also, the cost can be reduced because the number of layers is reduced and thereby the number of processing steps is reduced. An increase in the number of layers to be laminated may also cause contamination of a foreign substance and thereby reduce the yield. Fortunately, roll to roll lamination as in the present embodiment can reduce the number of layers to be laminated and thus can improve the yield.

The positive A plate 21A has an in-plane retardation of 120 nm or greater. This can reduce the reflectance of the liquid crystal display device 1 to enhance the contrast ratio.

The positive A plate 21A has an in-plane retardation of preferably 120 nm or greater and 135 nm or smaller, more preferably 120 nm or greater and 130 nm or smaller.

Specific examples of the positive A plate 21A include a retardation layer including a liquid crystal compound with fixed alignment, and a retardation layer obtained by stretching a resin film for a positive A plate.

The retardation layer including a liquid crystal compound with fixed alignment is described. A specific example of the retardation layer including a liquid crystal compound with fixed alignment is a retardation layer that includes a film (alignment film) after alignment treatment and a liquid crystal material, such as a reactive mesogen, whose molecules are aligned on the film. An example of the method for forming such a retardation layer is a method including applying a liquid crystal material including a liquid crystal compound to a substrate film after alignment treatment and fixing the alignment of molecules of the liquid crystal compound. A suitable example of the liquid crystal compound is polymerizable liquid crystal. Any method can be employed as long as the desired retardation is achieved, including a method including performing no special alignment treatment on a substrate film and a method including fixing the alignment of molecules of a liquid crystal compound and separating the compound layer from a substrate film and transferring the compound layer to a different film. Also, a method without fixing the alignment of molecules of a liquid crystal material may be employed.

The polymerizable liquid crystal means a compound containing a polymerizable group and having properties of liquid crystal. The polymerizable group means a group that is involved in a polymerization reaction and is preferably a photopolymerizable group. The photopolymerizable group means a group that can be involved in a polymerization reaction using an active radical or acid generated from a photopolymerization initiator. Examples of the polymerizable group include vinyl, vinyloxy, 1-chlorovinyl, isopropenyl, 4-vinylphenyl, acryloyloxy, methacryloyloxy, oxiranyl, and oxetanyl groups. Preferred among these are acryloyloxy, methacryloyloxy, vinyloxy, oxiranyl, and oxetanyl groups, and more preferred is an acryloyloxy group. The polymerizable liquid crystal may be a thermotropic liquid crystal or a lyotropic liquid crystal. When thermotropic liquid crystals are categorized according the degree of order, the polymerizable liquid crystal may be a nematic liquid crystal or a smectic liquid crystal. Still, a thermotropic nematic liquid crystal is preferred in terms of easiness of film formation.

Specific examples of the polymerizable liquid crystal include compounds having a polymerizable group among the compounds disclosed in "3.8.6 Network (completely cross-linked type)" and "6.5.1 Liquid crystal material b. Polymerizable nematic liquid crystal material" of Liquid Crystal Handbook (Ekisho Binran), the LCD Handbook Editorial Committee (Ekisho Binran Hensyu Iinkai), Maruzen Co., Ltd., published on Oct. 30, 2000); and polymerizable liquid crystals disclosed in JP 2010-31223 A, JP 2010-270108 A, JP 2011-6360 A, and JP 2011-207765 A.

The retardation layer obtained by stretching a resin film for a positive A plate is described. Examples of the material of the resin film for a positive A plate include acyclic polyolefins such as polypropylene, cyclic polyolefins such as polynorbornene, celluloses such as cellulose triacetate and cellulose diacetate, polyesters, polycarbonates, polyacrylates, polymethacrylates, polystyrene, liquid crystal compositions, and mixtures and copolymers of these. Examples of the resin film for a positive A plate using a cyclic polyolefin as a material include "Zeonor®" available from Zeon Corporation.

The in-plane retardation of the positive A plate 21A Re(A1), the NZ coefficient of the positive A plate 21A NZ(A1), and the thickness retardation of the positive C plate 21C Rth(C1) satisfy the relation expressed by the following Formula 1:

$$P-10 \leq Rth(C1) \leq P+10 \quad \text{(Formula 1)}$$

wherein P satisfies the relation expressed by the following Formula P1:

$$P=Re(A1)-(Re(A1)/NZ(A1)-95)-(120-Re(A1)) \quad \text{(Formula P1).}$$

This embodiment can reduce light leakage in the black display state when the device is viewed from an oblique direction.

Re(A1), Rth(C1), and NZ(A1) more preferably satisfy the relation expressed by the following Formula 1-1.

$$P-5 \leq Rth(C1) \leq P+5 \quad \text{(Formula 1-1)}$$

The positive C plate 21C may be formed, for example, by applying a vertical alignment film to a substrate formed from a resin such as polyethylene terephthalate, applying polymerizable liquid crystal to be vertically aligned to the substrate to form a polymerizable liquid crystal layer, and disposing the polymerizable liquid crystal layer in a predetermined position of the liquid crystal panel with an adhesive material. The vertical alignment film may or may not be transferred to the liquid crystal panel side. The vertical alignment film is an alignment film that aligns liquid crystal molecules in the liquid crystal layer in a direction perpendicular to the surface of the vertical alignment film with no voltage applied.

The positive C plate 21C has a thickness retardation of preferably 82 nm or greater and 98 nm or smaller, more preferably 85 nm or greater and 95 nm or smaller.

The positive C plate 21C has an in-plane retardation of preferably 0 nm or greater and 5 nm or smaller, more preferably 0 nm or greater and 3 nm or smaller.

The positive A plate 22A has an in-plane retardation of preferably 120 nm or greater and 135 nm or smaller, more preferably 120 nm or greater and 130 nm or smaller.

In order to allow the out-cell retardation layer 21 and the in-cell retardation layer 22 to cancel out the each other's in-plane retardations and thereby to achieve a state where the out-cell retardation layer 21 and the in-cell retardation layer 22 substantially do not exist, the in-plane retardation of the positive A plate 21A included in the out-cell retardation layer 21 is preferably equal to the in-plane retardation of the positive A plate 22A included in the in-cell retardation layer 22. Here, the phrase "the in-plane retardation of the positive A plate 21A is equal to the in-plane retardation of the positive A plate 22A" includes the case where their in-plane retardation values are substantially equal to each other as well as the case where their in-plane retardation values are completely equal to each other. The difference between the in-plane retardation of the positive A plate 21A and the in-plane retardation of the positive A plate 22A is preferably 5 nm or smaller, more preferably 3 nm or smaller.

The positive A plate 22A has an NZ coefficient of preferably 0.8 or greater and 1.3 or smaller, more preferably 0.9 or greater and 1.2 or smaller.

The positive A plate 22A is preferably the retardation layer including a liquid crystal compound with fixed alignment, which has been given as a specific example of the positive A plate 21A. This structure can reduce the thickness of the in-cell retardation layer 22 that is a positive A plate, and thereby can suppress color mixing caused by parallax of the liquid crystal display device 1.

The horizontally aligned liquid crystal layer 1L includes liquid crystal molecules. The liquid crystal molecules may have a positive or negative anisotropy of dielectric constant ($\Delta\epsilon$) defined by the following formula. Liquid crystal molecules having a positive anisotropy of dielectric constant are also referred to as positive liquid crystal and liquid crystal molecules having a negative anisotropy of dielectric constant are also referred to as negative liquid crystal. The direction of the major axis of liquid crystal molecules corresponds to the direction of the slow axis thereof.

$$\Delta\epsilon = \text{(dielectric constant in the major axis direction)} - \text{(dielectric constant in the minor axis direction)}$$

In the horizontally aligned liquid crystal layer 1L, in order to suppress light leakage in the black display state, the alignment azimuth of the liquid crystal molecules to which a voltage for providing black display is applied (in the black display state) forms an angle of about 90° with the absorption axis of the first polarizer 1P or the second polarizer 2P, and in order to achieve a better transmittance in the white display state, the alignment azimuth of the liquid crystal molecules to which a voltage for providing white display is applied (in the white display state) forms an angle of about 45° with the alignment azimuth of the liquid crystal molecules in the black display state. Here, the viewing angle compensation layer 11 is not disposed between the liquid crystal layer 1L and one of the first polarizer 1P or the second polarizer 2P (hereinafter, also referred to as a specific polarizer), whichever has an absorption axis forming an angle of about 0° with the alignment azimuth of the liquid crystal molecules. Since the absorption axis of the specific polarizer and the alignment azimuth of the liquid crystal molecules form an angle of about 0°, the angle formed by the alignment azimuth of the liquid crystal molecules and the absorption axis of the specific polarizer remains at about 0° even when the device is viewed from the normal direction E or from an oblique direction (e.g., a direction at a polar angle of 60° and an azimuth angle of 45°). This structure thus can allow the liquid crystal layer 1L to cause no retardation even when the device is viewed from an oblique direction. Here, if the viewing angle compensation layer 11 is disposed between the specific polarizer and the liquid crystal layer 1L, the polarization state of light between the specific polarizer and the liquid crystal layer 1L is unfortunately changed. As a result, the liquid crystal layer 1L unfortunately functions as a retardation layer when viewed from an oblique direction to cause light leakage. Therefore, no viewing angle compensation layer 11 is disposed between the specific polarizer and the liquid crystal layer 1L. In other words, the viewing angle compensation layer 11 is disposed between the liquid crystal layer 1L and one of the first polarizer 1P or the second polarizer 2P, whichever has an absorption axis forming an angle of about 90° with the alignment azimuth of the liquid crystal molecules.

The angle about 0° herein means an angle within the range of 0°±3°, preferably within the range of 0°±1°, more preferably within the range of 0°±0.5°, particularly preferably 0°. The angle about 45° herein means an angle within the range of 45°±3°, preferably within the range of 45°±1°, more preferably within the range of 45°±0.5°, particularly preferably 45°. The angle about 90° herein means an angle within the range of 90°±3°, preferably within the range of 90°±1°, more preferably within the range of 90°±0.5°, particularly preferably 90°. The angle about 135° herein means an angle within the range of 135°±3°, preferably within the range of 135°±1°, more preferably within the range of 135°±0.5°, particularly preferably 135°.

The viewing angle compensation layer 11 is a laminate (hereinafter, also referred to as a first laminate) including: the positive A plate 11A having an NZ coefficient of 0.7 or greater and 1.3 or smaller and an in-plane retardation of 130 nm or greater and 150 nm or smaller; and the positive C plate 11C having an in-plane retardation of 0 nm or greater and 10 nm or smaller and a thickness retardation of 80 nm or greater and 100 nm or smaller, in the stated order from the first polarizer 1P side.

The positive C plate 11C has an in-plane retardation of preferably 0 nm or greater and 5 nm or smaller, more preferably 0 nm or greater and 3 nm or smaller.

The positive C plate 11C has a thickness retardation of preferably 82 nm or greater and 98 nm or smaller, more preferably 85 nm or greater and 95 nm or smaller.

The positive C plate 11C may be formed by the same method as for the positive C plate 21C.

The positive A plate 11A has an in-plane retardation of preferably 132 nm or greater and 148 nm or smaller, more preferably 135 nm or greater and 145 nm or smaller.

The positive A plate 11A has an NZ coefficient of preferably 0.8 or greater and 1.2 or smaller, more preferably 0.9 or greater and 1.1 or smaller.

The positive A plate 11A can be produced by the same method as for the positive A plate 21A.

The slow axis of the positive A plate 11A in the viewing angle compensation layer 11 preferably forms an angle of about 90° with the absorption axis of the adjacent polarizer, i.e., the first polarizer 1P. In the case where the slow axis of the positive A plate 11A is set to form an angle of about 0° with the absorption axis of the first polarizer 1P, the angle formed by the absorption axis of the first polarizer 1P and the slow axis of the positive A plate 11A remains at about 0° even when the liquid crystal display device 1 is viewed from the normal direction E or from an oblique direction (e.g., a direction at a polar angle of 60° and an azimuth angle of 45°). Thus, the positive A plate 11A does not function as a retardation layer, and linearly polarized light having passed through the first polarizer 1P results in a similar state to the state where no positive A plate 11A is disposed. Meanwhile, in the case where the slow axis of the positive A plate 11A is set to form an angle of about 90° with the absorption axis of the first polarizer 1P, when the liquid crystal display device 1 is observed from the normal direction E, the angle formed by the absorption axis of the first polarizer 1P and the slow axis of the positive A plate 11A is about 90°. Thus, the positive A plate 11A does not function as a retardation layer, and linearly polarized light having passed through the first polarizer 1P results in a similar state to the state where no positive A plate 11A is disposed. In contrast, when the liquid crystal display device 1 is viewed from an oblique direction (e.g., a direction at a polar angle of 60° and an azimuth angle of 45°), the angle formed by the absorption axis of the first polarizer 1P and the slow axis of the positive A plate 11A is shifted from about 90°. Thus, the positive A plate 11A functions as a retardation layer, whereby the viewing angle can be compensated.

The liquid crystal display device 1 of the present embodiment includes the blue antireflection film 1RE on the viewing surface side of the first polarizer 1P. The circularly polarizing plate including the first polarizer 1P and the positive A plate 21A that is a λ/4 plate can most effectively reduce reflection of light having a wavelength 4 times the in-plane retardation of the positive A plate 21A. In the present embodiment, the positive A plate 21A has an in-plane retardation of 120 nm or greater and smaller than 137.5 nm. For example, when the positive A plate 21A has an in-plane retardation of 130 nm, reflection of light having a wavelength of 520 nm is most effectively reduced. When the positive A plate 21A has an in-plane retardation of 120 nm, reflection of light having a wavelength of 480 nm is most effectively reduced, which means that the wavelength of light whose reflection is reduced by the circularly polarizing plate shifts to the shorter wavelength side. As a result, the color of reflected light of the circularly polarizing plate has reddishness. In the present embodiment, the blue antireflection film 1RE can reduce the reddishness of the reflected color.

The antireflection film 1RE has a minimum visible light reflectance (reflectance to light in the wavelength range of 380 nm or greater and 780 nm or smaller) within the wavelength range of 550 nm or greater and 780 nm or smaller. This antireflection film 1RE can provide a greater reflectance to red light than to blue light. Thus, the blue antireflection film 1RE can reduce the reddishness of the reflected color of the circularly polarizing plate. Specifically, the light reflection spectrum of the antireflection film 1RE is expressed by a downward convex function in the visible light region, and shows an asymmetric curve with respect to the wavelength providing the minimum value. The reflectance at a wavelength of 380 nm is greater than the reflectance at a wavelength of 780 nm.

The minimum value is preferably within the wavelength range of 550 nm or greater and 720 nm or smaller, more preferably within the wavelength range of 550 nm or greater and 650 nm or smaller.

The antireflection film 1RE may have a single-layer structure. In this case, the antireflection film 1RE can be formed from a material having a low refractive index, for example. Examples of the material having a low refractive index include "Cytop®" available from AGC Inc., "Opstar®" available from Arakawa Chemical Industries, Ltd., and "Fluoro Surf®" available from FluoroTechnology Co., Ltd. The wavelength and reflectance of light reflected by the blue antireflection film 1RE can be appropriately designed by adjusting the refractive index and the thickness of the material having a low refractive index.

The material having a low refractive index has a refractive index of preferably 1.30 or higher and 1.45 or lower, more preferably 1.33 or higher and 1.40 or lower. The antireflection film 1RE may have a multilayer structure.

Modified Example 1 of Embodiment 1

The viewing angle compensation layer 11 of Embodiment 1 may be a laminate (hereinafter, also referred to as a second laminate) including: a first biaxial retardation layer having an NZ coefficient of 1.3 or greater and 1.5 or smaller and an in-plane retardation of 80 nm or greater and 100 nm or smaller; and a second biaxial retardation layer having an NZ coefficient of −1.2 or greater and −0.8 or smaller and an in-plane retardation of 50 nm or greater and 70 nm or smaller, in the stated order from the first polarizer 1P side. The viewing angle compensation layer 11 including the second laminate having a different layer structure from the first laminate is optically equal as a whole to the viewing angle compensation layer 11 including the first laminate.

The first biaxial retardation layer may be formed by simultaneous biaxial stretching or sequential biaxial stretching a material with a positive birefringence, for example. Specific examples of the material with a positive birefringence include the same as the examples for the material of the resin film for a positive A plate.

The second biaxial retardation layer may be formed by simultaneous biaxial stretching or sequential biaxial stretching a material with a negative birefringence, for example. Examples of the material with a negative birefringence include polymers containing at a side chain thereof a chemical bond or a functional group having large polarization anisotropy, such as an aromatic group and a carbonyl group, and specific examples thereof include polyacrylates, polymethacrylates, polystyrene, polymaleimide, and polyfumarates.

The first biaxial retardation layer preferably has an NZ coefficient of 1.32 or greater and 1.48 or smaller and an in-plane retardation of 82 nm or greater and 98 nm or smaller, and more preferably has an NZ coefficient of 1.35 or greater and 1.45 or smaller and an in-plane retardation of 85 nm or greater and 95 nm or smaller.

The second biaxial retardation layer preferably has an NZ coefficient of −1.22 or greater and −0.78 or smaller and an in-plane retardation of 52 nm or greater and 68 nm or smaller, and more preferably has an NZ coefficient of −1.25 or greater and −0.75 or smaller and an in-plane retardation of 55 nm or greater and 65 nm or smaller.

The slow axes of the first and second biaxial retardation layers each preferably form an angle of about 90° with the absorption axis of the adjacent polarizer, i.e., the first polarizer 1P, for the same reason why the slow axis of the positive A plate 11A in the viewing angle compensation layer 11 preferably forms an angle of about 90° with the absorption axis of the adjacent polarizer, i.e., the first polarizer 1P in Embodiment 1.

Modified Example 2 of Embodiment 1

The viewing angle compensation layer 11 of Embodiment 1 may be a laminate (hereinafter, also referred to as a third laminate) including: a third biaxial retardation layer having an NZ coefficient of 1.1 or greater and 1.3 or smaller and an in-plane retardation of 100 nm or greater and 130 nm or smaller; and a fourth biaxial retardation layer having an NZ coefficient of −4.5 or greater and −3.5 or smaller and an in-plane retardation of 10 nm or greater and 30 nm or smaller, in the stated order from the first polarizer 1P side. The viewing angle compensation layer 11 including the third laminate having a different layer structure from the first laminate is optically equal as a whole to the viewing angle compensation layer 11 including the first laminate.

The third biaxial retardation layer may be formed by the same method as for the first biaxial retardation layer. The fourth biaxial retardation layer may be formed by the same method as for the second biaxial retardation layer.

The third biaxial retardation layer preferably has an NZ coefficient of 1.12 or greater and 1.28 or smaller and an in-plane retardation of 105 nm or greater and 125 nm or smaller, and more preferably has an NZ coefficient of 1.15 or greater and 1.25 or smaller and an in-plane retardation of 110 nm or greater and 120 nm or smaller.

The fourth biaxial retardation layer preferably has an NZ coefficient of −4.4 or greater and −3.6 or smaller and an in-plane retardation of 12 nm or greater and 28 nm or smaller, and more preferably has an NZ coefficient of −4.3 or greater and −3.5 or smaller and an in-plane retardation of 15 nm or greater and 25 nm or smaller.

The slow axes of the third and fourth biaxial retardation layers each preferably form an angle of about 90° with the absorption axis of the adjacent polarizer, i.e., the first polarizer 1P, for the same reason why the slow axis of the positive A plate 11A in the viewing angle compensation layer 11 preferably forms an angle of about 90° with the absorption axis of the adjacent polarizer, i.e., the first polarizer 1P in Embodiment 1.

Modified Example 3 of Embodiment 1

The viewing angle compensation layer 11 of Embodiment 1 may be a λ/2 plate as the retardation layer having an NZ coefficient of 0.4 or greater and 0.6 or smaller and an in-plane retardation of 230 nm or greater and 320 nm or smaller. The viewing angle compensation layer 11 including the λ/2 plate having a different layer structure from the first laminate is optically equal as a whole to the viewing angle compensation layer 11 including the first laminate.

The λ/2 plate may be formed, for example, by applying a coating film liquid in which a resin is dissolved or dispersed in a solvent to a shrinkable film to form a coating film and shrinking the coating film. The coating film may be shrunk by, for example, heating the laminate including the shrinkable film and the coating film to shrink the shrinkable film and thereby shrinking the coating film. Examples of the resin include polyarylate, polyamides, polyimides, polyesters, polyaryletherketones, polyamide imide, polyester imide, polyvinyl alcohol, polyfumarates, polyethersulfones, polysulfones, polynorbornene, polycarbonates, cellulose, and polyurethanes. These polymers may be used alone or in combination. Specific examples of the material for the shrinkable film include polyolefins (cyclic polyolefins and acyclic polyolefins, preferably acyclic polyolefins), polyesters, polyacrylates, polymethacrylates, polyamides, polycarbonates, polynorbornene, polystyrene, polyvinyl chloride, polyvinylidene chloride, cellulose, polyethersulfones, polysulfones, polyimides, polyacetates, polyarylates, polyvinyl alcohol, and liquid crystal polymers. These may be used alone or in combination. More specifically, the λ/2 plate may be formed by the method disclosed in the paragraphs 0061 and 0063 in JP 2017-181735 A.

Alternatively, the λ/2 plate may be formed by stretching a polymer film. Specific examples of the material for the polymer film include acyclic polyolefins such as polycarbonate and polypropylene, polyesters such as polyethylene terephthalate and polyethylene naphthalate, cyclic polyolefins such as polynorbornene, polyvinyl alcohol, polyvinyl butyral, polymethyl vinyl ether, polyhydroxyethyl acrylate, hydroxyethyl cellulose, hydroxypropyl cellulose, methyl cellulose, polyarylates, polysulfones, polyethersulfones, polyphenylene sulfide, polyphenylene oxides, polyallyl sulfones, polyvinyl alcohol, polyamide, polyimide, polyvinyl chloride, and cellulose. These may be used alone or in combination. More specifically, the λ/2 plate may be formed by stretching a polycarbonate film in the manner as described in the paragraph 0123 in JP 2004-325468 A.

The λ/2 plate preferably has an NZ coefficient of 0.42 or greater and 0.58 or smaller and an in-plane retardation of 240 nm or greater and 310 nm or smaller, and more preferably has an NZ coefficient of 0.45 or greater and 0.55 or smaller and an in-plane retardation of 250 nm or greater and 300 nm or smaller.

The slow axis of the λ/2 plate preferably forms an angle of about 90° with the absorption axis of the adjacent polarizer, i.e., the first polarizer 1P, for the same reason why the slow axis of the positive A plate 11A in the viewing angle compensation layer 11 preferably forms an angle of about 90° with the absorption axis of the adjacent polarizer, i.e., the first polarizer 1P in Embodiment 1.

Embodiment 2

In the present embodiment, the features unique to the present embodiment are mainly described and the same features as those in the above embodiment are not described again. Embodiment 1 describes an embodiment in which the viewing angle compensation layer 11 is disposed between the first polarizer 1P and the out-cell retardation layer 21. The present embodiment describes an embodiment in which the viewing angle compensation layer 11 is disposed between the second substrate 200 and the second polarizer 2P.

Figure 5:
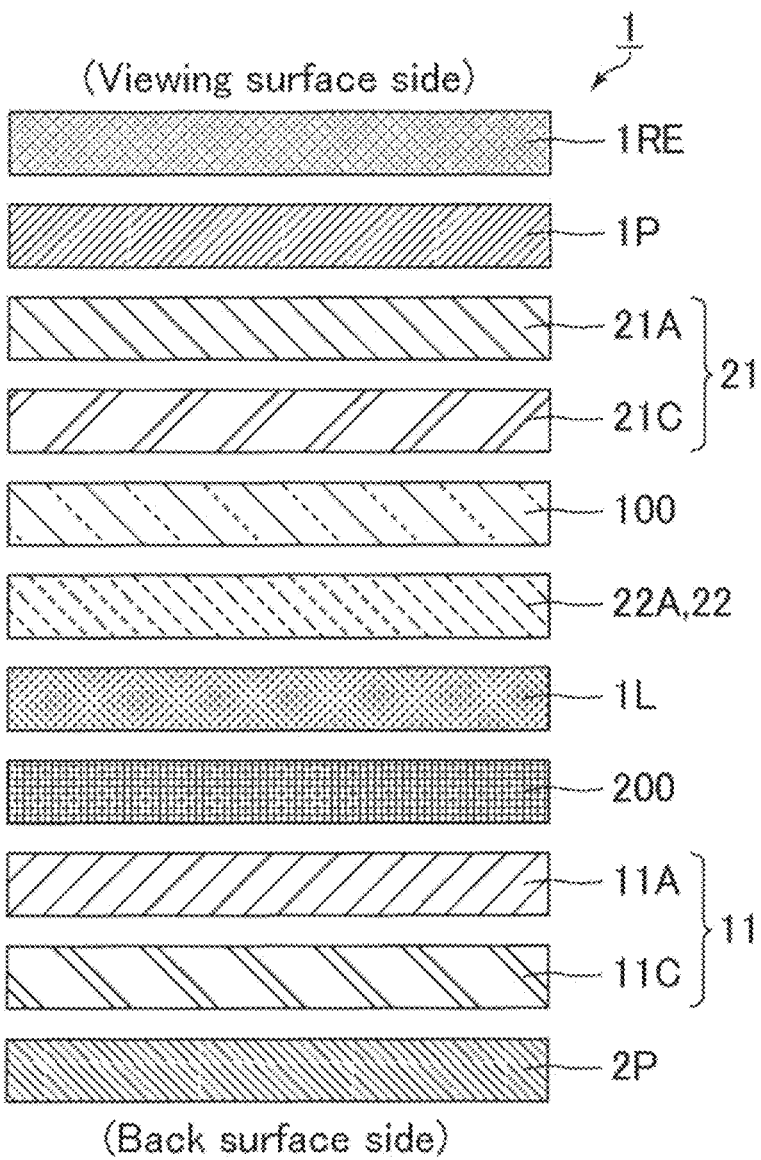
FIG. 5 is a schematic cross-sectional view of a liquid crystal display device of Embodiment 2.

FIG. 5 is a schematic cross-sectional view of a liquid crystal display device of Embodiment 2. A liquid crystal display device 1 of the present embodiment includes, in the following order from the viewing surface side, the blue antireflection film 1RE, the first polarizer 1P, the out-cell retardation layer 21, the first substrate 100, the in-cell retardation layer 22, the horizontally aligned liquid crystal layer 1L, the second substrate 200, the viewing angle compensation layer 11, and the second polarizer 2P. The viewing angle compensation layer 11 is the first laminate including the positive A plate 11A and positive C plate 11C used in Embodiment 1 in the stated order from the second polarizer 2P side. The out-cell retardation layer 21 is a laminate including: the positive A plate 21A as the first retardation layer, having an NZ coefficient of 1.0 or greater and 1.1 or smaller and an in-plane retardation of 120 nm or greater and smaller than 137.5 nm; and the positive C plate 21C as the second retardation layer, having an in-plane retardation of 0 nm or greater and 10 nm or smaller and a thickness retardation of 80 nm or greater and 150 nm or smaller, in the stated order from the first polarizer 1P side. The in-cell retardation layer 22 is the positive A plate 22A as the third retardation layer, having an NZ coefficient of 0.7 or greater and 1.4 or smaller and an in-plane retardation of 120 nm or greater and smaller than 137.5 nm. The positive A plates 21A and 22A are λ/4 plates.

In the present embodiment, the first polarizer 1P and the second polarizer 2P are arranged in the crossed Nicols as in Embodiment 1. Although this structure causes axial dislocation from the crossed Nicols formation when the device is viewed from an oblique direction, the viewing angle compensation layer 11 can correct the axial dislocation.

In the present embodiment, the out-cell retardation layer 21 is disposed in combination with the first polarizer 1P to function as a circularly polarizing plate, which can reduce reflection of external light. Accordingly, the slow axis of the positive A plate 21A that is a λ/4 plate is set to form an angle of about 45° (or about 135°) with the absorption axis of the first polarizer 1P.

The slow axis of the positive A plate 22A that is a λ/4 plate is set to form an angle of about 90° with the slow axis of the positive A plate 21A. Thereby, at least in the front direction, the out-cell retardation layer 21 and the in-cell retardation layer 22 can cancel out the each other's in-plane retardations to achieve a state where the out-cell retardation layer 21 and the in-cell retardation layer 22 substantially do not exist. This structure resultantly provides transmissive display with similar optical properties to those of a typical FFS mode device while achieving low reflection. As described above, in order to cancel the retardation of the in-cell retardation layer 22 formed from the positive A plate 22A at all the azimuths, the out-cell retardation layer 21 may be formed from a negative A plate. Unfortunately, materials for the negative A plate tend to be torn, i.e., are fragile. The liquid crystal display device 1 of the present embodiment employs a laminate including the positive A plate 21A and the positive C plate 21C as the out-cell retardation layer 21 so that the out-cell retardation layer 21 works as a negative A plate in appearance, which can prevent deterioration in fragileness of the out-cell retardation layer 21.

As described above, in the process in which a first polarizer and an out-cell retardation layer are combined into a circularly polarizing plate, the first polarizer and a positive A plate constituting the out-cell retardation layer need to be bonded such that the absorption axis of the first polarizer forms an angle of about 45° (or about 135°) with the slow axis of the positive A plate. The positive A plate constituting the out-cell retardation layer is often a film formed by oblique stretching and having an NZ coefficient of about 1.6 in order to achieve direct bonding of the film to a PVA film as the first polarizer. However, as the NZ coefficient of the positive A plate in the out-cell retardation layer increases, light leakage is caused in the black display state when the device is viewed from an oblique direction. Furthermore, an increase in black luminance when the device is viewed from an oblique direction, which is caused by the increase in NZ coefficient, is greater in a liquid crystal display device with a viewing angle compensation film than in a liquid crystal display device without a viewing angle compensation film.

Accordingly, in the present embodiment, the NZ coefficient of the positive A plate 21A of the out-cell retardation layer 21 is set to 1.0 or greater and 1.1 or smaller. This can reduce light leakage in the black display state when the device is viewed from an oblique direction.

The in-plane retardation of the positive A plate 21A is set to smaller than 137.5 nm. This enables stable production of the positive A plate 21A by oblique stretching. As a result, the positive A plate 21A and the first polarizer 1P can be directly bonded such that the absorption axis of the first polarizer 1P forms an angle of about 45° (or about 135°) with the slow axis of the positive A plate 21A by roll to roll lamination, which enables easy production of the liquid crystal display device 1. The circularly polarizing plate produced by roll to roll lamination has a smaller number of layers to be laminated than the circularly polarizing plate produced by sheet lamination, which can reduce the thickness of the circularly polarizing plate as a whole. Also, the cost can be reduced because the number of layers is reduced and thereby the number of processing steps is reduced. An increase in the number of layers to be laminated may also cause contamination of a foreign substance and thereby reduce the yield. Fortunately, roll to roll lamination as in the present embodiment can reduce the number of layers to be laminated and thus can improve the yield.

The positive A plate 21A has an in-plane retardation of 120 nm or greater. This can reduce the reflectance of the liquid crystal display device 1 to enhance the contrast ratio.

The in-plane retardation of the positive A plate 21A Re(A1), the NZ coefficient of the positive A plate 21A NZ(A1), and the thickness retardation of the positive C plate 21C Rth(C1) preferably satisfy the relation expressed by the following Formula 2:

$$Q-10 \leq Rth(C1) \leq Q+10 \quad \text{(Formula 2)}$$

wherein Q satisfies the relation expressed by the following Formula Q1:

$$Q=Re(A1)-(Re(A1)/NZ(A1)-100)-(120-Re(A1))\times(NZ(A1)-1.0)\times100 \quad \text{(Formula Q1)}.$$

This embodiment can further reduce light leakage in the black display state when the device is viewed from an oblique direction.

Re(A1), Rth(C1), and NZ(A1) more preferably satisfy the relation expressed by the following Formula 2-1.

$$Q-5 \leq Rth(C1) \leq Q+5 \quad \text{(Formula 2-1)}$$

The slow axis of the positive A plate 11A in the viewing angle compensation layer 11 in the present embodiment preferably forms an angle of about 90° with the absorption axis of the adjacent polarizer, i.e., the second polarizer 2P, for the same reason why the slow axis of the positive A plate 11A in the viewing angle compensation layer 11 preferably forms an angle of about 90° with the absorption axis of the adjacent polarizer, i.e., the first polarizer 1P in Embodiment 1.

Modified Example 1 of Embodiment 2

The viewing angle compensation layer 11 of Embodiment 2 may be the second laminate including the first biaxial retardation layer and second biaxial retardation layer used in Modified Example 1 of Embodiment 1 in the stated order from the second polarizer 2P side.

The slow axes of the first and second biaxial retardation layers each preferably form an angle of about 90° with the absorption axis of the adjacent polarizer, i.e., the second polarizer 2P, for the same reason why the slow axis of the positive A plate 11A in the viewing angle compensation layer 11 preferably forms an angle of about 90° with the absorption axis of the adjacent polarizer, i.e., the second polarizer 2P in Embodiment 2.

Modified Example 2 of Embodiment 2

The viewing angle compensation layer 11 of Embodiment 2 may be a third laminate including the third biaxial retardation layer and fourth biaxial retardation layer used in Modified Example 2 of Embodiment 1 in the stated order from the second polarizer 2P side.

The slow axes of the third and fourth biaxial retardation layers each preferably form an angle of about 90° with the absorption axis of the adjacent polarizer, i.e., the second polarizer 2P, for the same reason why the slow axis of the positive A plate 11A in the viewing angle compensation layer 11 preferably forms an angle of about 90° with the absorption axis of the adjacent polarizer, i.e., the second polarizer 2P in Embodiment 2.

Modified Example 3 of Embodiment 2

The viewing angle compensation layer 11 of Embodiment 2 may be the $\lambda/2$ plate used in Modified Example 3 of Embodiment 1.

The slow axis of the $\lambda/2$ plate preferably forms an angle of about 90° with the absorption axis of the adjacent polarizer, i.e., the second polarizer 2P, for the same reason why the slow axis of the positive A plate 11A in the viewing angle compensation layer 11 preferably forms an angle of about 90° with the absorption axis of the adjacent polarizer, i.e., the second polarizer 2P in Embodiment 2.

The present invention is described below in more detail based on examples and comparative examples. The examples, however, are not intended to limit the scope of the present invention.

Example 1-1

Figure 6:
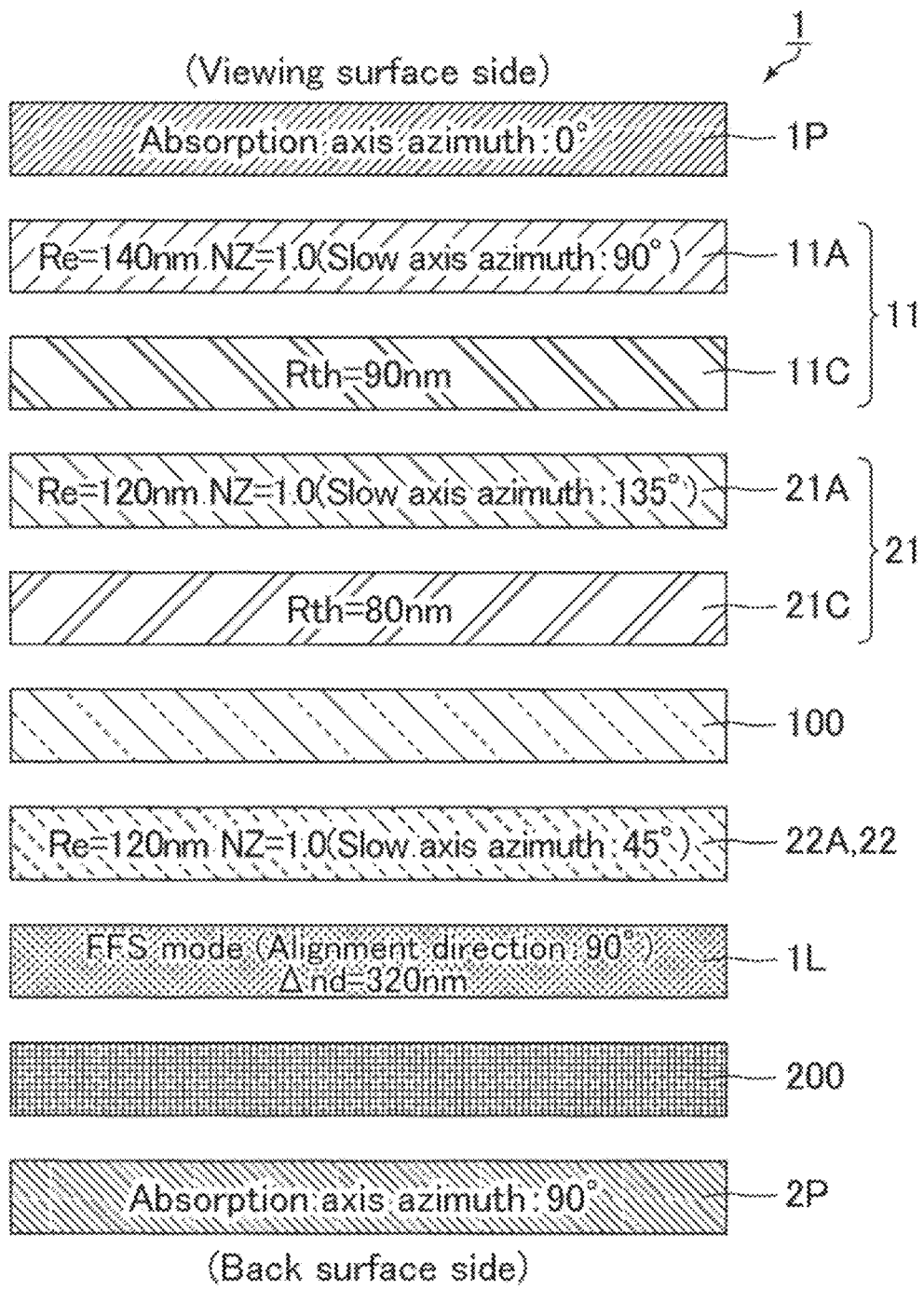
FIG. 6 is a schematic cross-sectional view of a liquid crystal display device of Embodiment 1-1.

FIG. 6 is a schematic cross-sectional view of a liquid crystal display device of Example 1-1. In Example 1-1, a liquid crystal display device 1 having the same structure as in Embodiment 1 was discussed. In the schematic cross-sectional views of the liquid crystal display devices of the description, the angles of the first and second polarizers indicate the azimuth angles of their absorption axes, the angle of the liquid crystal layer indicates the alignment azimuth of the liquid crystal molecules in the black display state, and the angles of the other layers indicate the azimuth angles of their slow axes. Also, And of the liquid crystal layer indicates the liquid crystal retardation, which is the product of the refractive index anisotropy Δn of the liquid crystal layer and the thickness d of the liquid crystal layer.

In the liquid crystal display device 1 of Example 1-1, having the structure as shown in FIG. 6, the transmittance in the black display state was simulated at a polar angle θ of 60° in an azimuth angle φ range of 0° to 360°, using an LCD-Master, and the average value of the black transmittances at a polar angle θ of 60° was calculated. The average black transmittance value is the average of transmittance values in the black display state determined for every 5° within the azimuth angle range of 0° to 360°. Table 1 shows the results.

TABLE 1

|  | Example 1-1 | Example 1-2 | Example 1-3 | Example 1-4 | Example 1-5 | Example 1-6 | Example 1-7 |
|---|---|---|---|---|---|---|---|
| Thickness retardation of positive C plate in out-cell retardation layer [nm] | 80 | 85 | 90 | 95 | 100 | 105 | 110 |
| Average black transmittance [%] | 0.157 | 0.135 | 0.121 | 0.116 | 0.120 | 0.132 | 0.154 |

Examples 1-2 to 1-7

In liquid crystal display devices of Examples 1-2 to 1-7 each having the same structure as in Example 1-1 except that the thickness retardation of the positive C plate 21C was changed according to Table 1, the average black transmittance value was determined in the same manner as in Example 1-1. Table 1 shows the results.

Examples 2-1 to 2-7

In liquid crystal display devices of Examples 2-1 to 2-7 each having the same structure as in Example 1-1 except that the NZ coefficient of the positive A plate 21A was changed to 1.1 and the thickness retardation of the positive C plate 21C was changed according to the following Table 2, the average black transmittance value was determined in the same manner as in Example 1-1. Table 2 shows the results.

TABLE 2

|  | Example 2-1 | Example 2-2 | Example 2-3 | Example 2-4 | Example 2-5 | Example 2-6 | Example 2-7 |
|---|---|---|---|---|---|---|---|
| Thickness retardation of positive C plate in out-cell retardation layer [nm] | 90 | 95 | 100 | 105 | 110 | 115 | 120 |
| Average black transmittance [%] | 0.176 | 0.154 | 0.141 | 0.137 | 0.141 | 0.154 | 0.176 |

Examples 3-1 to 3-7

In liquid crystal display devices of Examples 3-1 to 3-7 each having the same structure as in Example 1-1 except that the in-plane retardation of the positive A plate 21A and the in-plane retardation of the positive A plate 22A were each changed to 130 nm and the thickness retardation of the positive C plate 21C was changed according to the following Table 3, the average black transmittance value was determined in the same manner as in Example 1-1. Table 3 shows the results.

TABLE 3

|  | Example 3-1 | Example 3-2 | Example 3-3 | Example 3-4 | Example 3-5 | Example 3-6 | Example 3-7 |
|---|---|---|---|---|---|---|---|
| Thickness retardation of positive C plate in out-cell retardation layer [nm] | 85 | 90 | 100 | 105 | 110 | 115 | 120 |
| Average black transmittance [%] | 0.189 | 0.159 | 0.125 | 0.122 | 0.127 | 0.142 | 0.165 |

Examples 4-1 to 4-7

In liquid crystal display devices of Examples 4-1 to 4-7 each having the same structure as in Example 1-1 except that the NZ coefficient of the positive A plate 21A was changed to 1.1, the in-plane retardation of the positive A plate 21A was changed to 130 nm, and the thickness retardation of the positive C plate 21C was changed according to the following Table 4, the average black transmittance value was determined in the same manner as in Example 1-1. Table 4 shows the results.

TABLE 4

| | Example 4-1 | Example 4-2 | Example 4-3 | Example 4-4 | Example 4-5 | Example 4-6 | Example 4-7 |
|---|---|---|---|---|---|---|---|
| Thickness retardation of positive C plate in out-cell retardation layer [nm] | 95 | 100 | 110 | 115 | 120 | 125 | 130 |
| Average black transmittance [%] | 0.214 | 0.183 | 0.148 | 0.144 | 0.148 | 0.162 | 0.184 |

(Evaluation of Examples 1-1 to 1-7, 2-1 to 2-7, 3-1 to 3-7, and 4-1 to 4-7)

In each of the liquid crystal display devices 1 of Examples 1-1 to 1-7, 2-1 to 2-7, 3-1 to 3-7, and 4-1 to 4-7, the positive A plate 21A in the out-cell retardation layer 21 has an in-plane retardation of 120 nm or 130 nm and the positive A plate 21A is thus producible by oblique stretching, which achieves easy production of the liquid crystal display device 1 as described above. Also, the liquid crystal display devices 1 of Examples 1-1 to 1-7, 2-1 to 2-7, 3-1 to 3-7, and 4-1 to 4-7 each include the out-cell retardation layer 21 and the in-cell retardation layer 22 and thereby can reduce reflection of external light. Here, an increase in black luminance when the device is viewed from an oblique direction, which is caused by an increase in NZ coefficient, is greater in a liquid crystal display device with a viewing angle compensation layer than in a liquid crystal display device without a viewing angle compensation layer. In each of the liquid crystal display devices 1 of Examples 1-1 to 1-7, 2-1 to 2-7, 3-1 to 3-7, and 4-1 to 4-7, the NZ coefficient of the positive A plate 21A was limited within the range of 1.0 or greater and 1.1 or smaller, which could reduce light leakage in the black display state when viewed from an oblique direction.

In Examples 1-1 to 1-7, 2-1 to 2-7, 3-1 to 3-7, and 4-1 to 4-7, the first laminate including the positive A plate 11A and the positive C plate 11C was used as the viewing angle compensation layer 11. As described, specific examples of the viewing angle compensation layer 11 include the first laminate, the second laminate, the third laminate, and the λ/2 plate, and all the viewing angle compensation layers 11 have the same function (the function changing the polarizing direction of linearly polarized light having passed through the second polarizer 2P into the direction parallel to the absorption axis of the first polarizer 1P). Thus, all the viewing angle compensation layers 11 are optically equal to one another as a whole. Therefore, even when the viewing angle compensation layer 11 of any of the liquid crystal display devices 1 of Examples 1-1 to 1-7, 2-1 to 2-7, 3-1 to 3-7, and 4-1 to 4-7 is changed to the second laminate, the third laminate, or the λ/2 plate, the liquid crystal display device can reduce reflection of external light and light leakage in the black display state when viewed from an oblique direction.

As shown in Table 1, among the liquid crystal display devices of Examples 1-1 to 1-7 in each of which the in-plane retardation of the positive A plate A21 was set to 120 nm and the NZ coefficient thereof was set to 1.0, the liquid crystal display device of Example 1-4 in which the thickness retardation of the positive C plate C21 was 95 nm had the lowest average black transmittance value. As shown in Table 2, among the liquid crystal display devices of Examples 2-1 to 2-7 in each of which the in-plane retardation of the positive A plate A21 was set to 120 nm and the NZ coefficient thereof was set to 1.1, the liquid crystal display device of Example 2-4 in which the thickness retardation of the positive C plate C21 was 105 nm had the lowest average black transmittance value. As shown in Table 3, among the liquid crystal display devices of Examples 3-1 to 3-7 in each of which the in-plane retardation of the positive A plate A21 was set to 130 nm and the NZ coefficient thereof was set to 1.0, the liquid crystal display device of Example 3-4 in which the thickness retardation of the positive C plate C21 was 105 nm had the lowest average black transmittance value. As shown in Table 4, among the liquid crystal display devices of Examples 4-1 to 4-7 in each of which the in-plane retardation of the positive A plate A21 was set to 130 nm and the NZ coefficient thereof was set to 1.1, the liquid crystal display device of Example 4-4 in which the thickness retardation of the positive C plate C21 was 115 nm had the lowest average black transmittance value. These results demonstrate that the following relation expressed by Formula 1X is satisfied between the optimal thickness retardation of the positive C plate C21 for reducing light leakage in the black display state when the device is viewed from an oblique direction and the in-plane retardation and NZ coefficient of the positive A plate 21A.

$$Rth(C1)=Re(A1)-(Re(A1)/NZ(A1)-95)-(120-Re(A1))$$ (Formula 1X)

Herein, Re(A1) represents the in-plane retardation of the positive A plate 21A, NZ(A1) represents the NZ coefficient of the positive A plate 21A, and Rth(C1) represents the thickness retardation of the positive C plate 21C.

As shown in Table 1, relative to the average black transmittance value of the liquid crystal display device of Example 1-4, which is the minimum average black transmittance value, the average black transmittance values in Examples 1-2 and 1-6 were each 1.2 times or less and the average black transmittance values in Examples 1-3 and 1-5 were each 1.05 times or less. As shown in Table 2, relative to the average black transmittance value of the liquid crystal display device of Example 2-4, which is the minimum average black transmittance value, the average black transmittance values in Examples 2-2 and 2-6 were each 1.2 times or less and the average black transmittance values in Examples 2-3 and 2-5 were each 1.05 times or less. As shown in Table 3, relative to the average black transmittance value of the liquid crystal display device of Example 3-4, which is the minimum average black transmittance value, the average black transmittance value in Example 3-6 was 1.2 times or less and the average black transmittance values in Examples 3-3 and 3-5 were each 1.05 times or less. As shown in Table 4, relative to the liquid crystal display device of Example 4-4, which is the minimum average black transmittance value, the average black transmittance value in Example 4-6 was 1.2 times or less and the average black transmittance values in Examples 4-3 and 4-5 were each 1.05 times or less. These results demonstrate that, when the thickness retardation of the positive C plate C21 is greater or smaller by 10 nm or less than the optimal thickness retardation of the positive C plate C21 for reducing light leakage in the black display state when the device is viewed from an oblique direction, the average black transmittance value can be 1.2 times or less the minimum value, which achieves a smaller reduction in CR viewing angle. The results also demonstrate that, when the thickness retardation of the positive C plate C21 is greater or smaller by 5 nm or less than the optimal value, the average black transmittance value can be 1.05 times or less the minimum value, which achieves a still smaller reduction in CR viewing angle. In other words, when Re(A1), Rth(C1), and NZ(A1) satisfy the relation expressed by the following Formula 1, the average black transmittance value can be 1.2 times or less the minimum value, which achieves a still smaller reduction in CR viewing angle. Furthermore, when Re(A1), Rth(C1), and NZ(A1) satisfy the relation expressed by the following Formula 1-1, the average black transmittance value can be 1.05 times or less the minimum value, which achieves a still smaller reduction in CR viewing angle. In Formula 1 and Formula 1-1, P satisfies the relation expressed by the following Formula P1.

$$P-10 \leq Rth(C1) \leq P+10 \quad \text{(Formula 1)}$$

$$P-5 \leq Rth(C1) \leq P+5 \quad \text{(Formula 1-1)}$$

$$P=Re(A1)-(Re(A1)/NZ(A1)-95)-(120-Re(A1)) \quad \text{(Formula P1)}$$

Example 5-1

Figure 7:
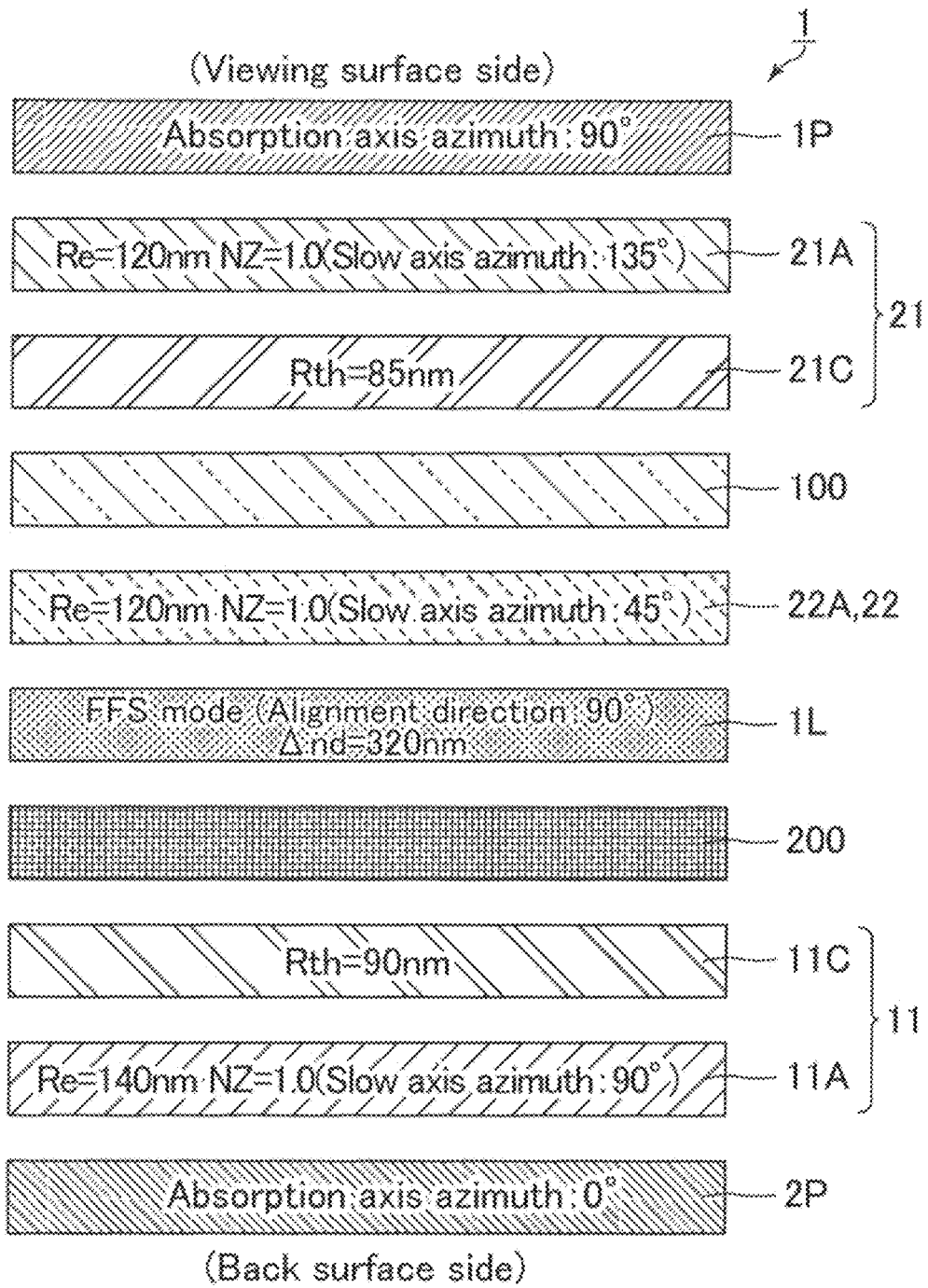
FIG. 7 is a schematic cross-sectional view of a liquid crystal display device of Embodiment 5-1.

FIG. 7 is a schematic cross-sectional view of a liquid crystal display device of Example 5-1. In Example 5-1, a liquid crystal display device 1 having the same structure as in Embodiment 2 was discussed. In a liquid crystal display device of Example 5-1 having the structure shown in FIG. 7, the average black transmittance value was determined in the same manner as in Example 1-1. Table 5 shows the results.

TABLE 5

|  | Example 5-1 | Example 5-2 | Example 5-3 | Example 5-4 | Example 5-5 | Example 5-6 | Example 5-7 |
| --- | --- | --- | --- | --- | --- | --- | --- |
| Thickness retardation of positive C plate in out-cell retardation layer [nm] | 85 | 90 | 95 | 100 | 105 | 110 | 115 |
| Average black transmittance [%] | 0.204 | 0.181 | 0.168 | 0.163 | 0.167 | 0.179 | 0.201 |

Examples 5-2 to 5-7

In liquid crystal display devices of Examples 5-2 to 5-7 each having the same structure as in Example 5-1 except that the thickness retardation of the positive C plate 21C was changed according to the following Table 5, the average black transmittance value was determined in the same manner as in Example 5-1. Table 5 shows the results.

Examples 6-1 to 6-7

In liquid crystal display devices of Examples 6-1 to 6-7 each having the same structure as in Example 5-1 except that the NZ coefficient of the positive A plate 21A was changed to 1.1 and the thickness retardation of the positive C plate 21C was changed according to the following Table 6, the average black transmittance value was determined in the same manner as in Example 5-1. Table 6 shows the results.

TABLE 6

|  | Example 6-1 | Example 6-2 | Example 6-3 | Example 6-4 | Example 6-5 | Example 6-6 | Example 6-7 |
| --- | --- | --- | --- | --- | --- | --- | --- |
| Thickness retardation of positive C plate in out-cell retardation layer [nm] | 105 | 110 | 115 | 120 | 125 | 130 | 135 |
| Average black transmittance [%] | 0.254 | 0.233 | 0.220 | 0.217 | 0.222 | 0.235 | 0.258 |

Examples 7-1 to 7-7

In liquid crystal display devices of Examples 7-1 to 7-7 each having the same structure as in Example 5-1 except that the in-plane retardation of the positive A plate 21A was changed to 130 nm and the thickness retardation of the positive C plate 21C was changed according to the following Table 7, the average black transmittance value was determined in the same manner as in Example 5-1. Table 7 shows the results.

TABLE 7

|  | Example 7-1 | Example 7-2 | Example 7-3 | Example 7-4 | Example 7-5 | Example 7-6 | Example 7-7 |
|---|---|---|---|---|---|---|---|
| Thickness retardation of positive C plate in out-cell retardation layer [nm] | 95 | 100 | 105 | 110 | 115 | 120 | 125 |
| Average black transmittance [%] | 0.209 | 0.188 | 0.176 | 0.173 | 0.179 | 0.193 | 0.217 |

Examples 8-1 to 8-7

In liquid crystal display devices of Examples 8-1 to 8-7 each having the same structure as in Example 5-1 except that the NZ coefficient of the positive A plate 21A was changed to 1.1, the in-plane retardation of the positive A plate 21A was changed to 130 nm, and the thickness retardation of the positive C plate 21C was changed according to the following Table 8, the average black transmittance value was determined in the same manner as in Example 5-1. Table 8 shows the results.

TABLE 8

|  | Example 8-1 | Example 8-2 | Example 8-3 | Example 8-4 | Example 8-5 | Example 8-6 | Example 8-7 |
|---|---|---|---|---|---|---|---|
| Thickness retardation of positive C plate in out-cell retardation layer [nm] | 115 | 120 | 125 | 130 | 135 | 140 | 145 |
| Average black transmittance [%] | 0.273 | 0.250 | 0.236 | 0.231 | 0.235 | 0.247 | 0.269 |

(Evaluation of Examples 5-1 to 5-7, 6-1 to 6-7, 7-1 to 7-7, and 8-1 to 8-7)

In each of the liquid crystal display devices 1 of Examples 5-1 to 5-7, 6-1 to 6-7, 7-1 to 7-7, and 8-1 to 8-7, the positive A plate 21A has an in-plane retardation of 120 nm or 130 nm and the positive A plate 21A is thus producible by oblique stretching, which achieves easy production of the liquid crystal display device 1 as described above. Also, the liquid crystal display devices 1 of Examples 5-1 to 5-7, 6-1 to 6-7, 7-1 to 7-7, and 8-1 to 8-7 each include the out-cell retardation layer 21 and the in-cell retardation layer 22 and thereby can reduce reflection of external light. Here, an increase in black luminance when the device is viewed from an oblique direction, which is caused by an increase in NZ coefficient, is greater in a liquid crystal display device with a viewing angle compensation layer than in a liquid crystal display device without a viewing angle compensation layer. In each of the liquid crystal display devices 1 of Examples 5-1 to 5-7, 6-1 to 6-7, 7-1 to 7-7, and 8-1 to 8-7, the NZ coefficient of the positive A plate 21A was limited within the range of 1.0 or greater and 1.1 or smaller, which could reduce light leakage in the black display state when viewed from an oblique direction.

In Examples 5-1 to 5-7, 6-1 to 6-7, 7-1 to 7-7, and 8-1 to 8-7, the first laminate including the positive A plate 11A and the positive C plate 11C was used as the viewing angle compensation layer 11. As described, specific examples of the viewing angle compensation layer 11 include the first laminate, the second laminate, the third laminate, and the λ/2 plate, and all the viewing angle compensation layers 11 have the same function (the function changing the polarizing direction of linearly polarized light having passed through the second polarizer 2P into the direction parallel to the absorption axis of the first polarizer 1P). Thus, all the viewing angle compensation layers 11 are optically equal to one another as a whole. Therefore, even when the viewing angle compensation layer 11 of any of the liquid crystal display devices 1 of Examples 5-1 to 5-7, 6-1 to 6-7, 7-1 to 7-7, and 8-1 to 8-7 is changed to the second laminate, the third laminate, or the λ/2 plate, the liquid crystal display device can reduce reflection of external light and light leakage in the black display state when viewed from an oblique direction.

As shown in Table 5, among the liquid crystal display devices of Examples 5-1 to 5-7 in each of which the in-plane retardation of the positive A plate A21 was set to 120 nm and the NZ coefficient thereof was set to 1.0, the liquid crystal display device of Example 5-4 in which the thickness retardation of the positive C plate C21 was 100 nm had the lowest average black transmittance value. As shown in Table 6, among the liquid crystal display devices of Examples 6-1 to 6-7 in each of which the in-plane retardation of the positive A plate A21 was set to 120 nm and the NZ coefficient thereof was set to 1.1, the liquid crystal display device of Example 6-4 in which the thickness retardation of the positive C plate C21 was 120 nm had the lowest average black transmittance value. As shown in Table 7, among the liquid crystal display devices of Examples 7-1 to 7-7 in each of which the in-plane retardation of the positive A plate A21 was set to 130 nm and the NZ coefficient thereof was set to 1.0, the liquid crystal display device of Example 7-4 in which the thickness retardation of the positive C plate C21 was 110 nm had the lowest average black transmittance value. As shown in Table 8, among the liquid crystal display devices of Examples 8-1 to 8-7 in each of which the in-plane retardation of the positive A plate A21 was set to 130 nm and the NZ coefficient thereof was set to 1.1, the liquid crystal display device of Example 8-4 in which the thickness retardation of the positive C plate C21 was 130 nm had the lowest average black transmittance value. These results demonstrate that the following relation expressed by Formula 2X is satisfied between the optimal thickness retardation of the positive C plate C21 for reducing light leakage in the black display state when the device is viewed from an oblique direction and the in-plane retardation and NZ coefficient of the positive A plate 21A.

$Rth(C1) = Re(A1) - (Re(A1)/NZ(A1) - 100) - (120 - Re(A1)) \times (NZ(A1) - 1.0) \times 100$     (Formula 2X)

As shown in Table 5, with respect to the liquid crystal display device of Example 5-4 having the minimum average black transmittance value, the average black transmittance values in Examples 5-2 and 5-6 were each 1.2 times or less and the average black transmittance values in Examples 5-3 and 5-5 were each 1.05 times or less. As shown in Table 6, with respect to the liquid crystal display device of Example 6-4 having the minimum average black transmittance value, the average black transmittance values in Examples 6-2 and 6-6 were each 1.2 times or less and the average black transmittance values in Examples 6-3 and 6-5 were each 1.05 times or less. As shown in Table 7, with respect to the liquid crystal display device of Example 7-4 having the minimum average black transmittance value, the average black transmittance values in Example 7-2 and 7-6 were each 1.2 times or less and the average black transmittance values in Examples 7-3 and 7-5 were each 1.05 times or less. As shown in Table 8, with respect to the liquid crystal display device of Example 8-4 having the minimum average black transmittance value, the average black transmittance values in Example 8-2 and 8-6 were each 1.2 times or less and the average black transmittance values in Examples 8-3 and 8-5 were each 1.05 times or less. These results demonstrate that, when the thickness retardation of the positive C plate C21 is greater or smaller by 10 nm or less than the optimal thickness retardation of the positive C plate C21 for reducing light leakage in the black display state when the device is viewed from an oblique direction, the average black transmittance value can be 1.2 times or less the minimum value, which achieves a still smaller reduction in CR viewing angle. The results also demonstrate that, when the thickness retardation of the positive C plate C21 is greater or smaller by 5 nm or less than the optimal value, the average black transmittance value can be 1.05 times or less the minimum value, which achieves a still smaller reduction in CR viewing angle. In other words, when Re(A1), Rth(C1), and NZ(A1) satisfy the relation expressed by the following Formula 2, the average black transmittance value can be 1.2 times or less the minimum value, which achieves a still smaller reduction in CR viewing angle. Furthermore, when Re(A1), Rth(C1), and NZ(A1) satisfy the relation expressed by the following Formula 2-1, the average black transmittance value can be 1.05 times or less the minimum value, which achieves a still smaller reduction in CR viewing angle. In Formula 2 and Formula 2-1, Q satisfies the relation expressed by the following Formula Q1.

$Q-10 \leq Rth(C1) \leq Q+10$ (Formula 2)

$Q-5 \leq Rth(C1) \leq Q+5$ (Formula 2-1)

$Q=Re(A1)-(Re(A1)/NZ(A1)-100)-(120-Re(A1))\times(NZ(A1)-1.0)\times100$ (Formula Q1)

Examples 9-1 and 9-2 and Comparative Examples 9-1 and 9-2

In each of liquid crystal display devices of Examples 9-1 and 9-2 and Comparative Examples 9-1 and 9-2, each of which had the same structure as in Example 1-4 except that an antireflection film was disposed on the viewing surface side of the first polarizer 1P and the in-plane retardation of the positive A plate 21A was changed according to Table 9, the reflectance of the liquid crystal panel was determined by simulation. The reflectance was determined by simulation at a panel white luminance of 300 cd/m² and a panel reflectance of 8.9%. The reflectance of the antireflection film was set to 0.4%. Table 9 shows the results. The panel reflectance herein means the reflectance of the panel including the first substrate 100, the liquid crystal layer 1L, and the second substrate 200.

TABLE 9

|  | Comparative Example 9-1 | Comparative Example 9-2 | Example 9-1 | Example 9-2 |
| --- | --- | --- | --- | --- |
| In-plane retardation of positive A plate in out-cell retardation layer [nm] | 100 | 110 | 120 | 130 |
| Bright room CR (20,000 lux) | 7.6 | 9.6 | 11.8 | 13.6 |

(Evaluation of Examples 9-1 and 9-2 and Comparative Examples 9-1 and 9-2)

Generally, a display device needs a contrast ratio (hereinafter, also referred to as CR) of 10 or greater in an environment at 20,000 lux in order to achieve a sufficient CR for a human. The results of Examples 9-1 and 9-2 shown in Table 9 demonstrate that the positive A plate 21A having an in-plane retardation of 120 nm or greater can sufficiently reduce the panel reflectance and thus can achieve a CR of 10 or greater. In Examples 9-1 and 9-2 and Comparative Examples 9-1 and 9-2, the panel white luminance was set to 300 cd/m² because a low panel white luminance is preferred for achieving low power consumption. Increasing the panel white luminance to 400 cd/m², 500 cd/m², or 1000 cd/m² can achieve a sufficient CR of greater than 10 even when the in-plane retardation of the positive A plate 21A is in the range of 100 nm or greater and 110 nm or smaller. Still, an increased panel white luminance is not preferred because it increases the power consumption.

Reference Examples 1-1 to 1-4

Figure 8:
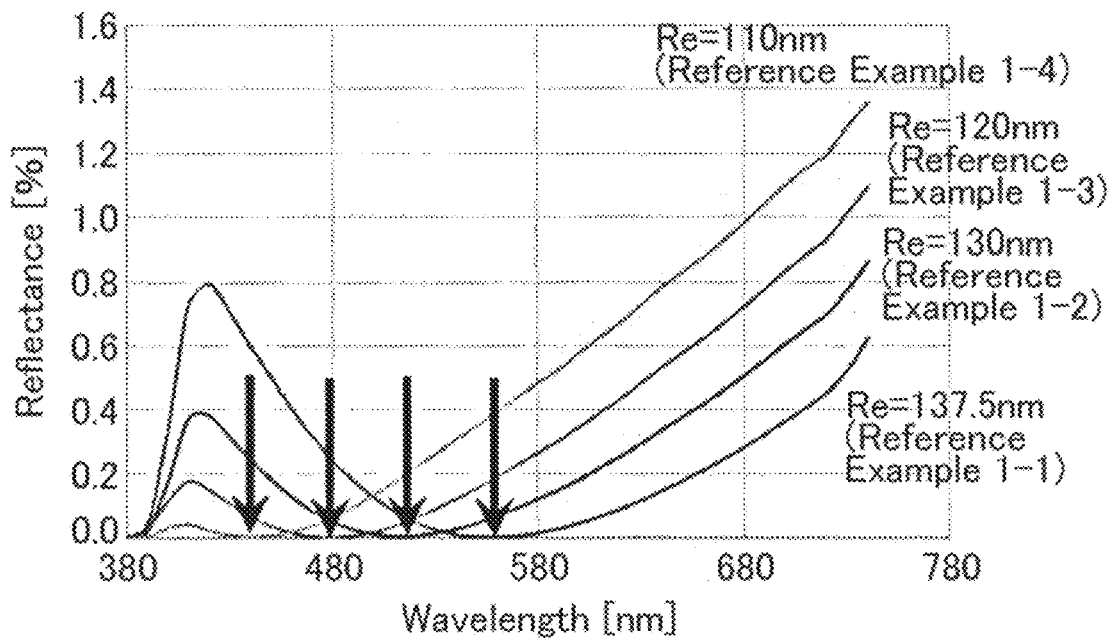
FIG. 8 is a graph showing the reflectance values of circularly polarizing plates of Reference Examples 1-1 to 1-4.
Figure 9:
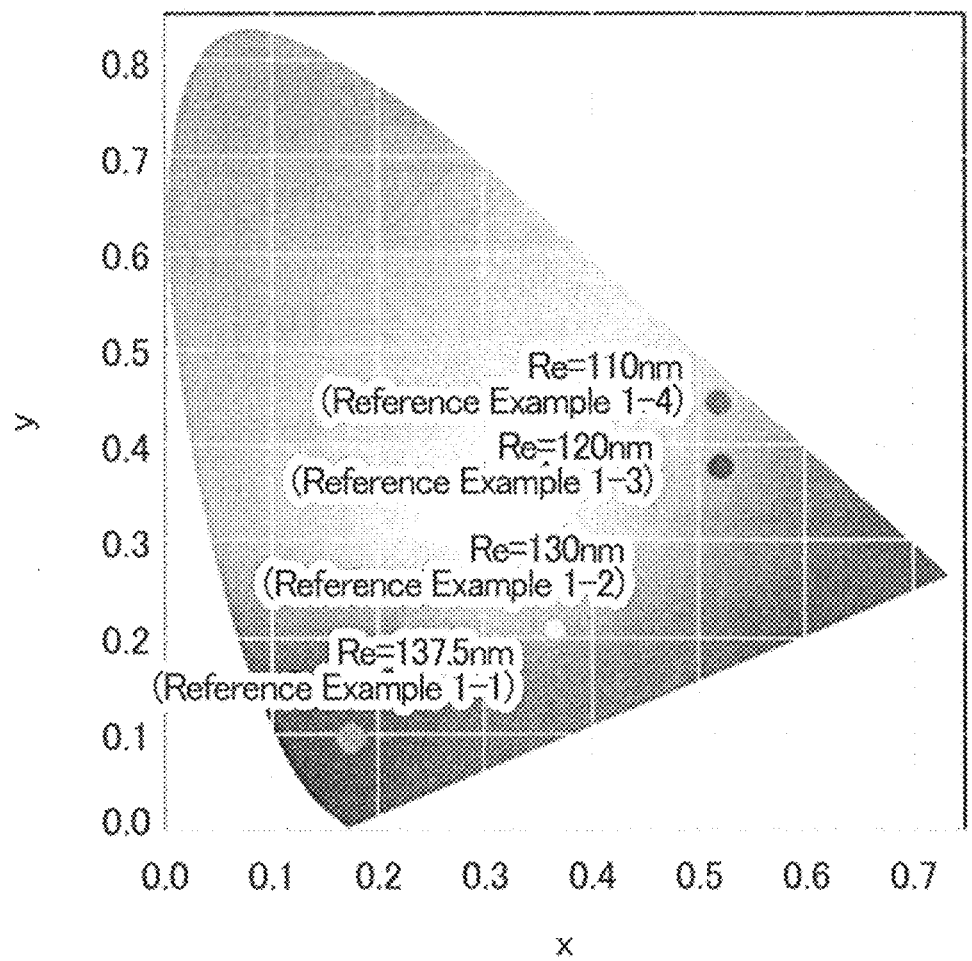
FIG. 9 is a chromaticity diagram showing the reflective chromaticity values of the circularly polarizing plates of Reference Examples 1-1 to 1-4.

In a circularly polarizing plate of Reference Example 1-1, which included a linear polarizer and a positive A plate having an NZ coefficient of 1.0 and an in-plane retardation of 137.5 nm, the reflectance and reflective chromaticity were measured with a spectrophotometer "CM-2600d" available from Konica Minolta, Inc. Also, in circularly polarizing plates of Reference Examples 1-2 to 1-4, which had the same structure as in Reference Example 1-1 except that the in-plane retardation of the positive A plate was changed to 130 nm, 120 nm, or 110 nm, the reflectance and the reflective chromaticity were measured in the same manner as in Reference Example 1-1. FIG. 8 is a graph showing the reflectance values of the circularly polarizing plates of Reference Examples 1-1 to 1-4. FIG. 9 is a chromaticity diagram showing the reflective chromaticity values of the circularly polarizing plates of Reference Examples 1-1 to 1-4.

FIG. 8 demonstrates that, as the in-plane retardation of the positive A plate constituting the circularly polarizing plate decreases, the wavelength of light to which the circularly polarizing plate provides the minimum reflectance is shifted to the shorter wavelength side. FIG. 9 demonstrates that such a circularly polarizing plate causes the reflected color to have reddishness.

Reference Example 2-1

Figure 10:
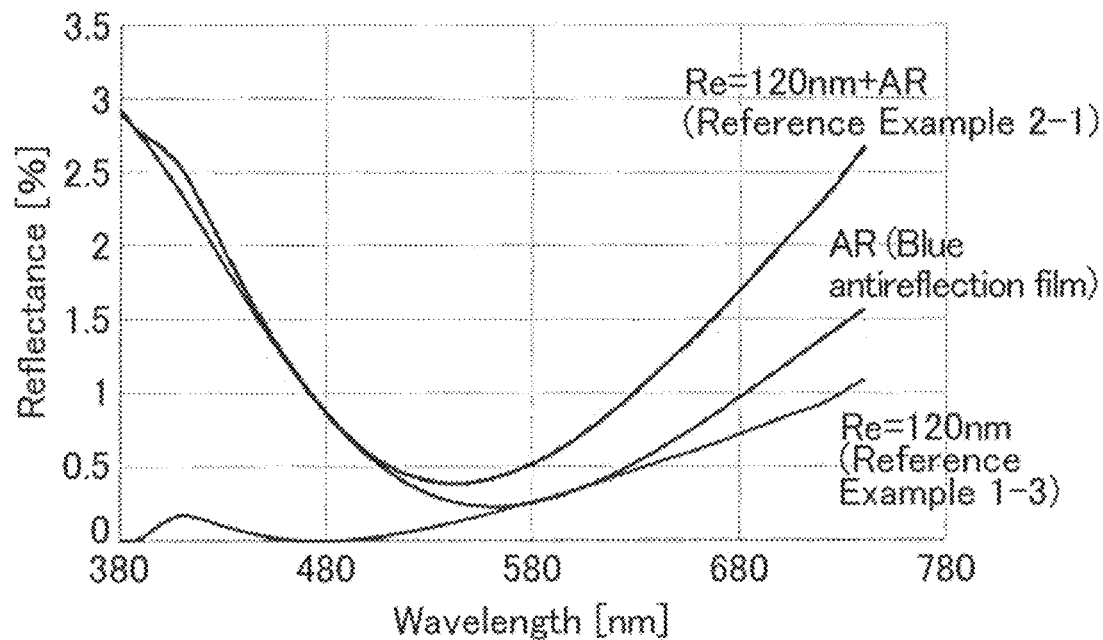
FIG. 10 is a graph showing the reflectance values of antireflection films of Reference Examples 1-3 and 2-1 and a blue antireflection film.
Figure 11:
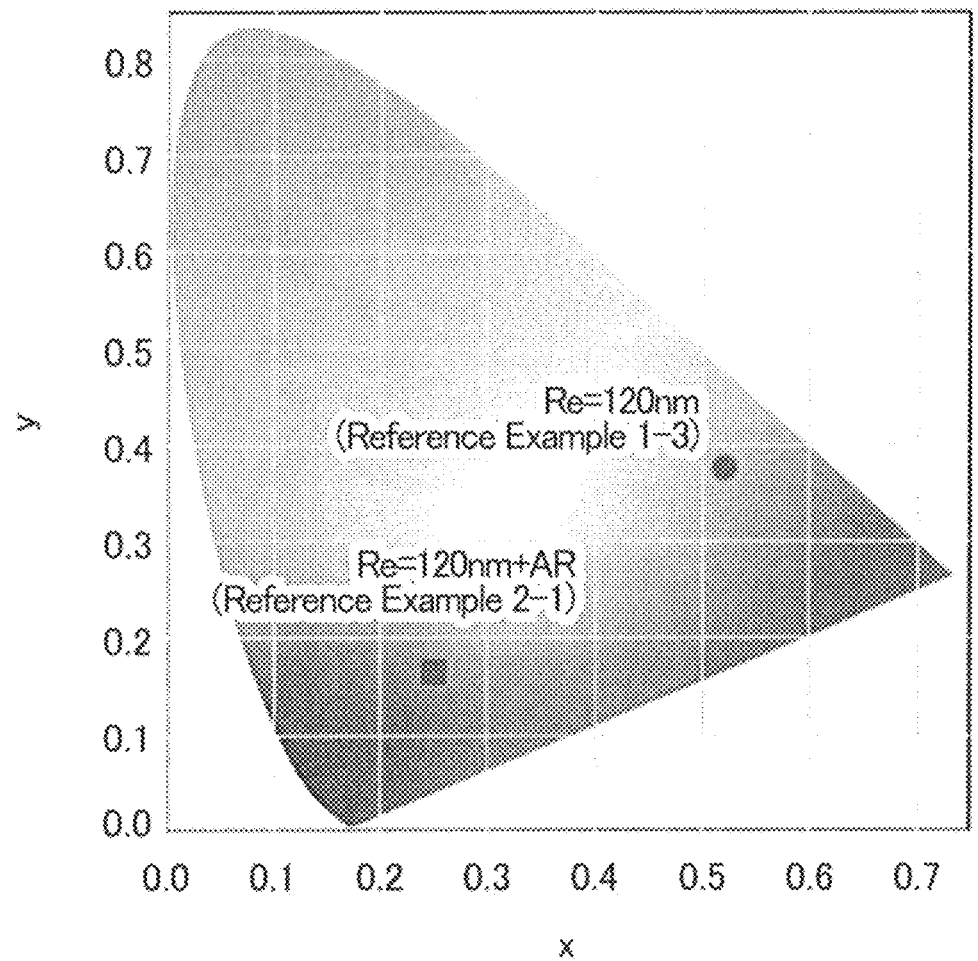
FIG. 11 is a chromaticity diagram showing the reflective chromaticity values of the circularly polarizing plates of Reference Examples 1-3 and 2-1.
Figure 12:
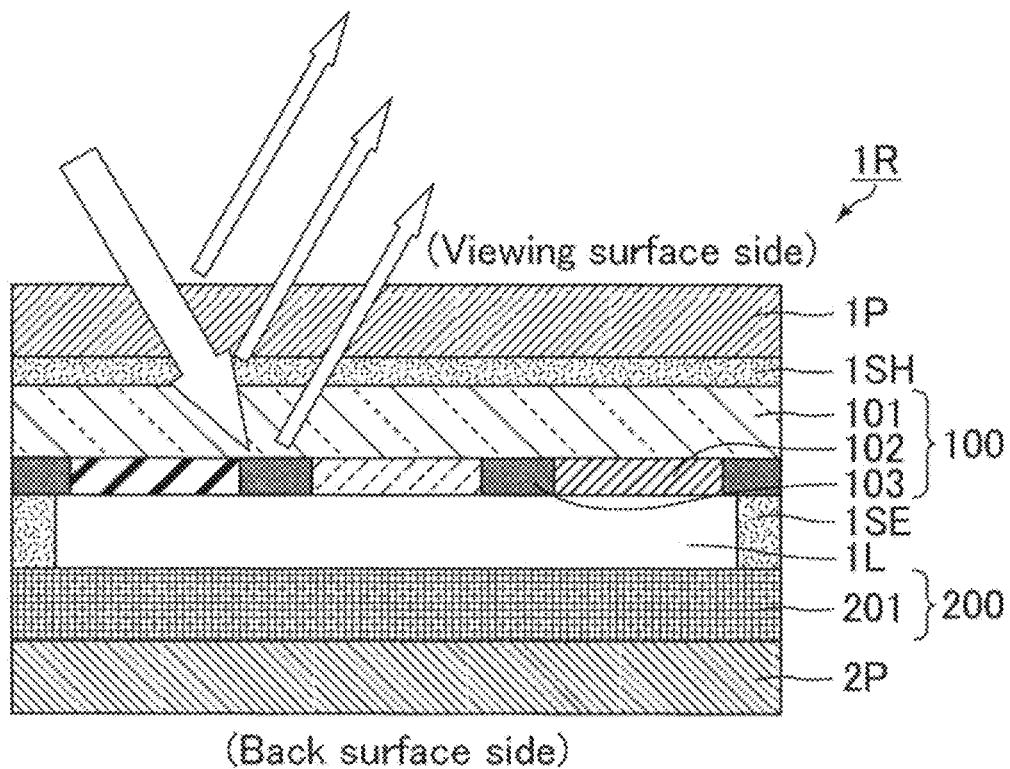
FIG. 12 is a schematic cross-sectional view of a liquid crystal display device of Comparative Embodiment 1.
Figure 13:
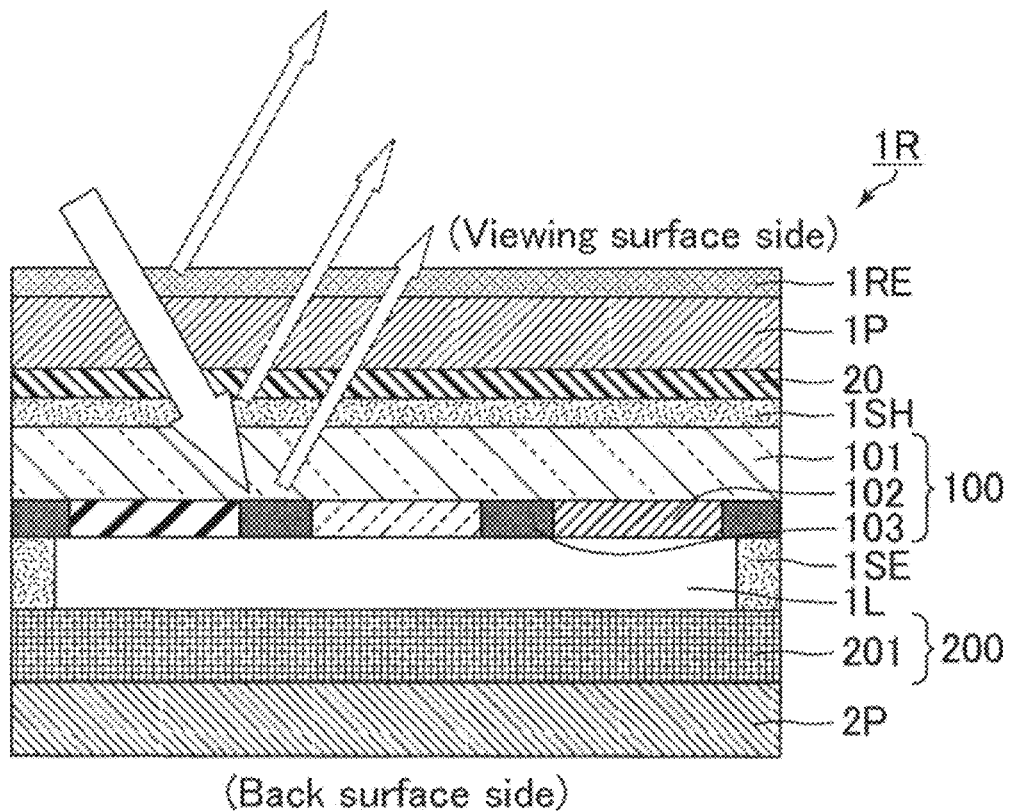
FIG. 13 is a schematic cross-sectional view of a liquid crystal display device of Comparative Embodiment 2.
Figure 14:
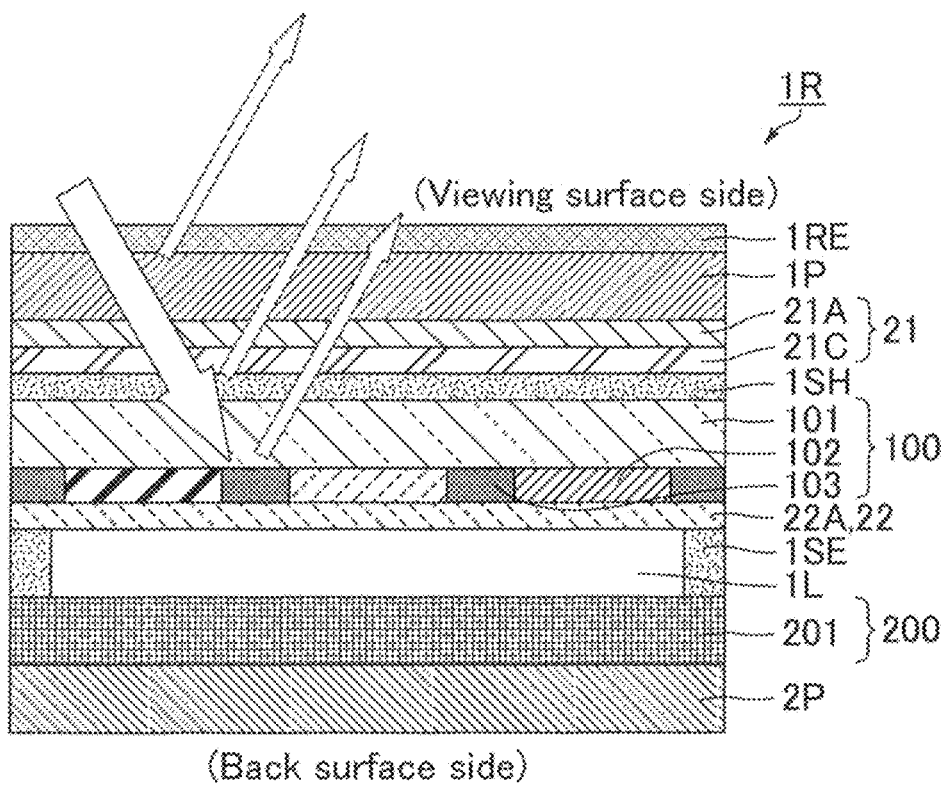
FIG. 14 is a schematic cross-sectional view of a liquid crystal display device of Comparative Embodiment 3.
Figure 15:
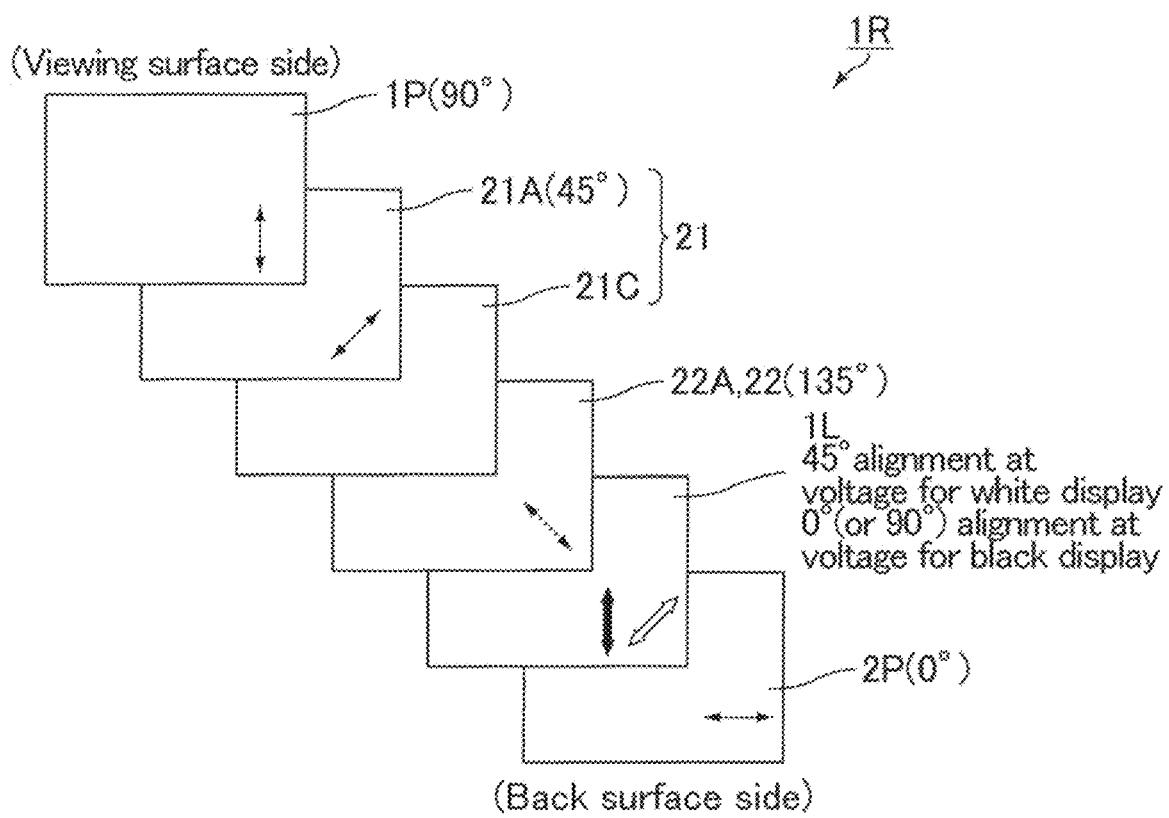
FIG. 15 is an exploded schematic perspective view of the liquid crystal display device of Comparative Embodiment 3.
Figure 16:
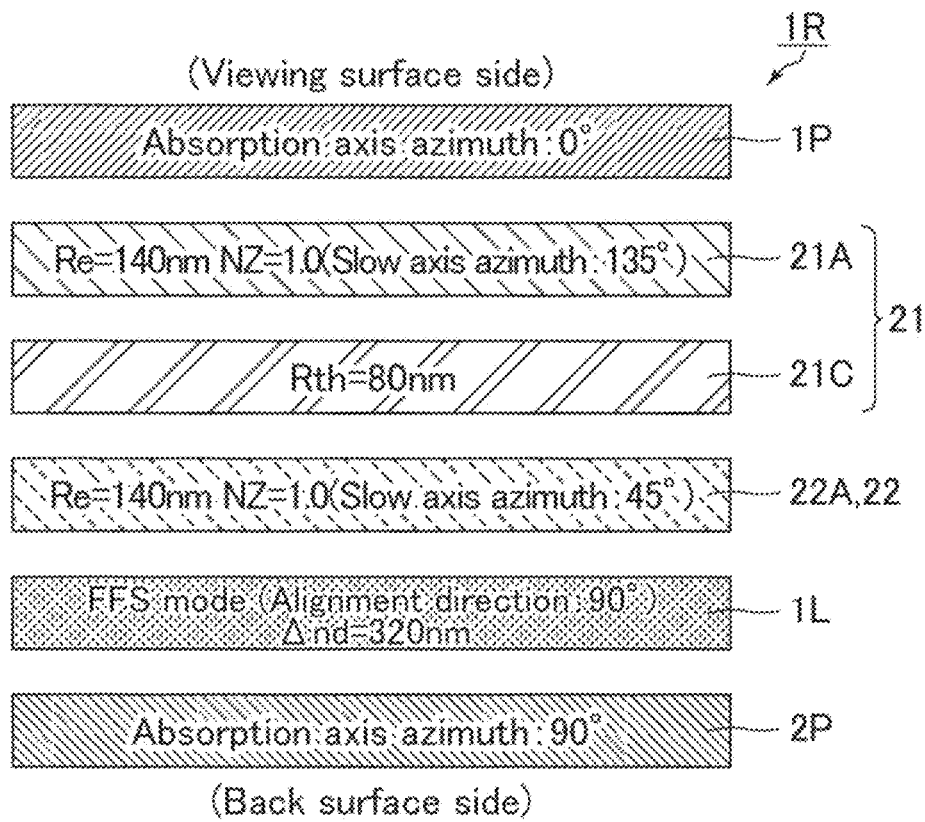
FIG. 16 is a schematic cross-sectional view of a liquid crystal display device of Comparative Embodiment 3-1.
Figure 17:
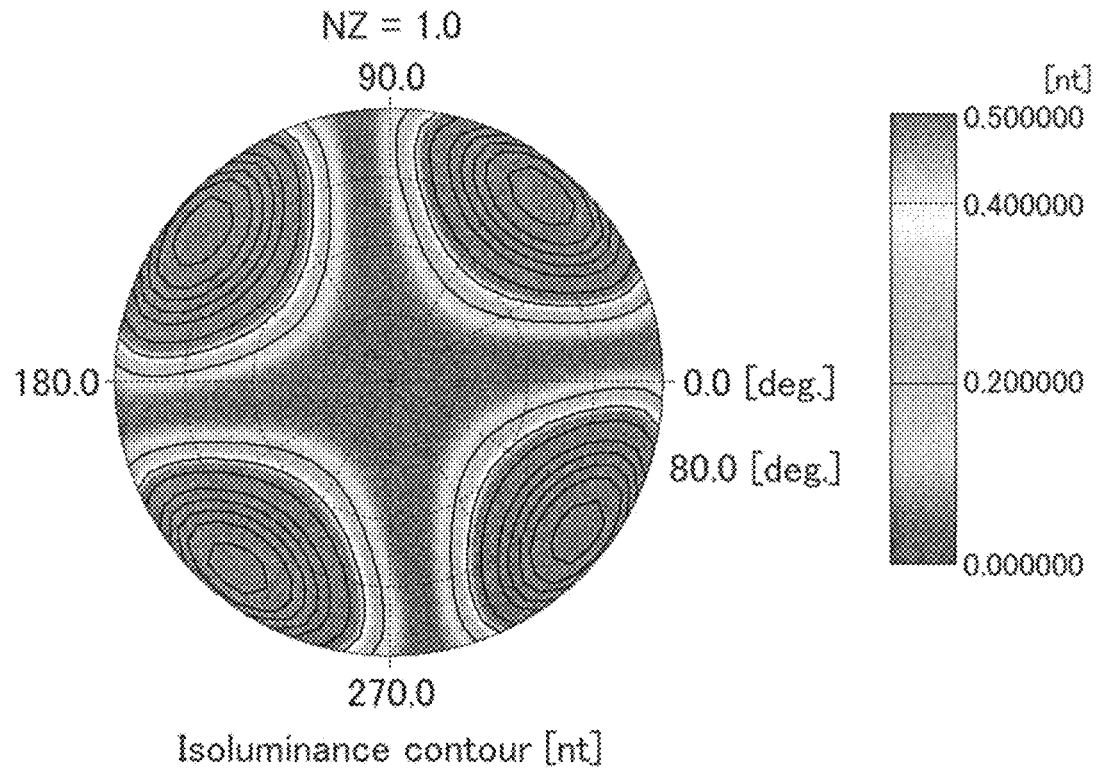
FIG. 17 shows a simulation result of the transmittance in the black display state of the liquid crystal display device of Comparative Embodiment 3-1, illustrating luminance contour lines (black transmittance chart) in the black display state within the azimuth angle range of 0° to 360° and the polar angle range of 0° to 80°.
Figure 18:
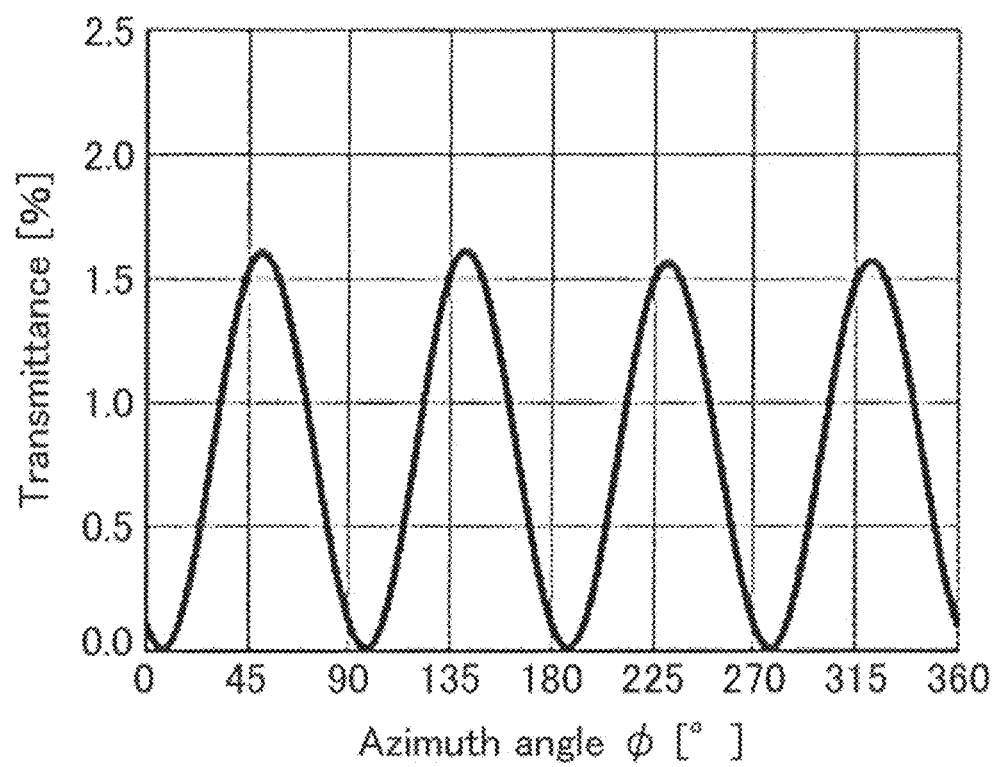
FIG. 18 is a graph of the simulation result of the transmittance in the black display state of the liquid crystal display device of Comparative Embodiment 3-1, showing the transmittance in the black display state at a polar angle of 60° within the azimuth angle range of 0° to 360°.
Figure 19:
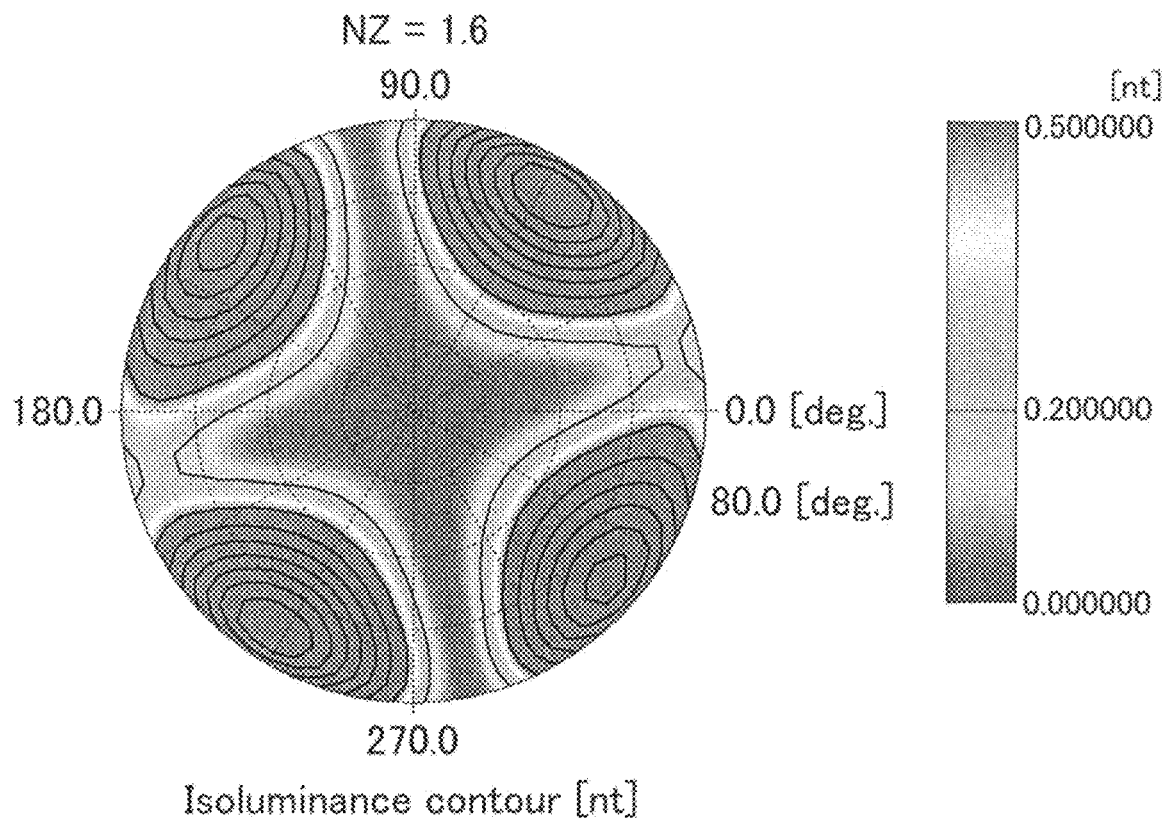
FIG. 19 shows a simulation result of the transmittance in the black display state of a liquid crystal display device of Comparative Embodiment 3-2, illustrating luminance contour lines (black transmittance chart) in the black display state within the azimuth angle range of 0° to 360° and the polar angle range of 0° to 80°.
Figure 20:
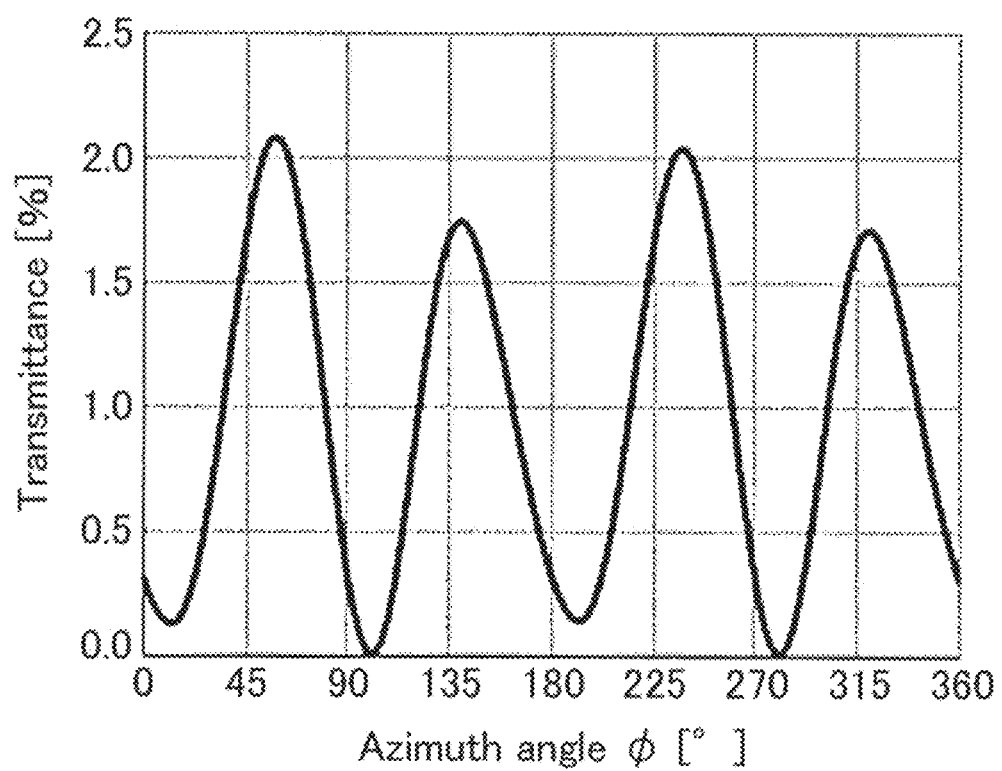
FIG. 20 is a graph of the simulation result of the transmittance in the black display state of the liquid crystal display device of Comparative Embodiment 3-2, showing the transmittance in the black display state at a polar angle of 60° within the azimuth angle range of 0° to 360°.
Figure 21:
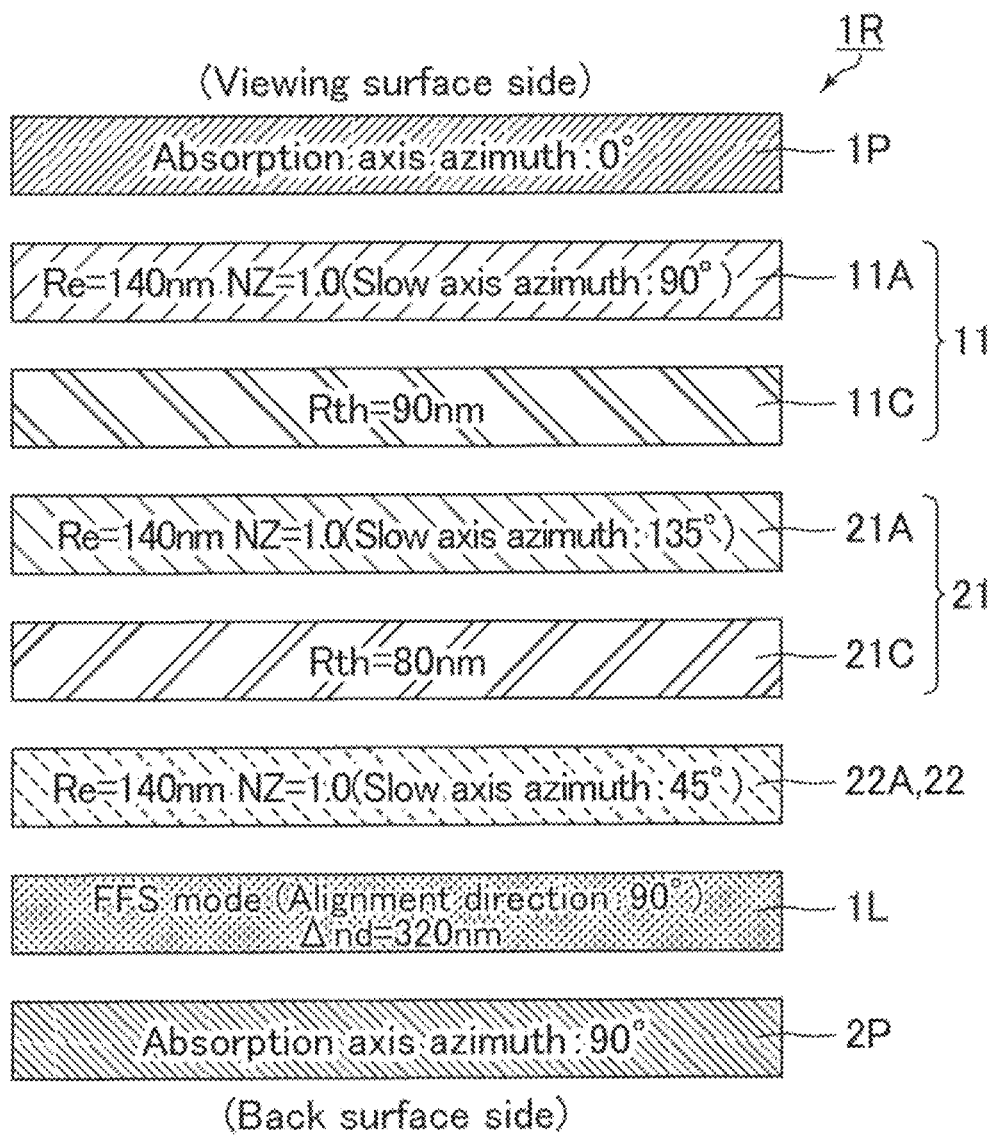
FIG. 21 is a schematic cross-sectional view of a liquid crystal display device of Comparative Embodiment 4-1.
Figure 22:
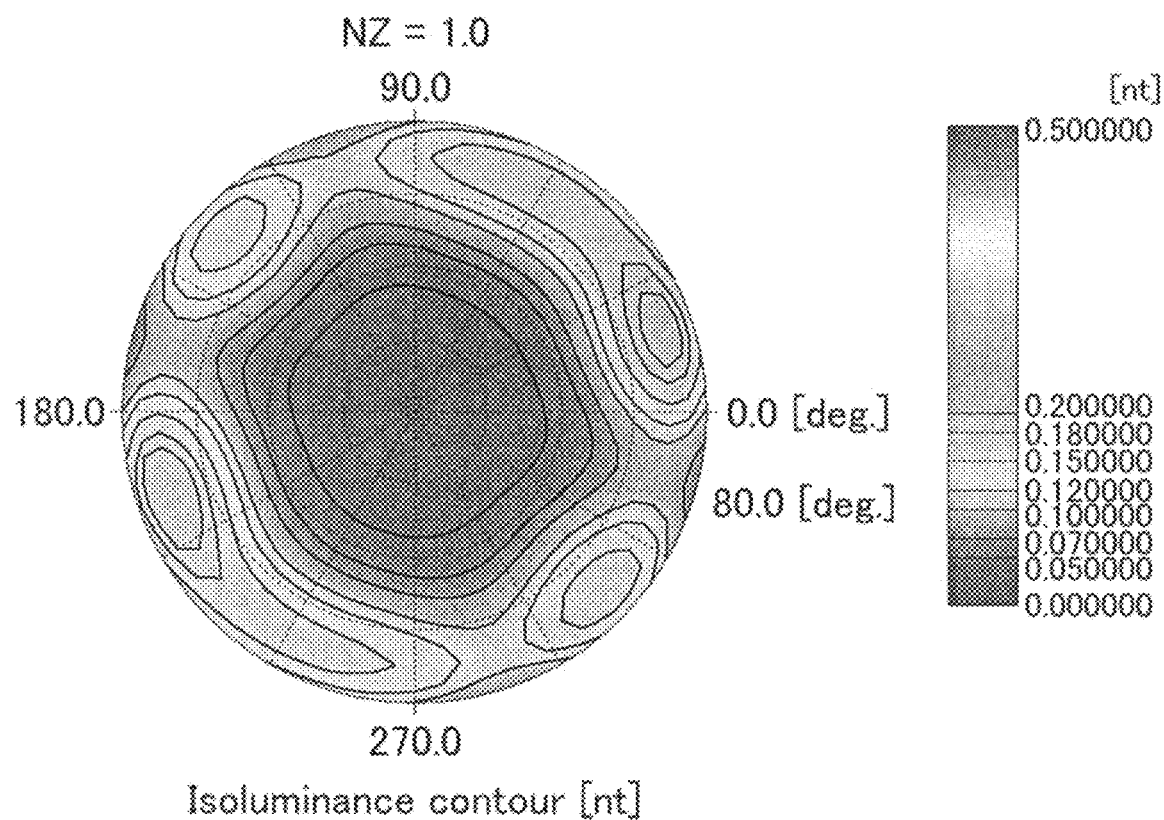
FIG. 22 shows a simulation result of the transmittance in the black display state of the liquid crystal display device of Comparative Embodiment 4-1, illustrating luminance contour lines (black transmittance chart) in the black display state within the azimuth angle range of 0° to 360° and the polar angle range of 0° to 80°.
Figure 23:
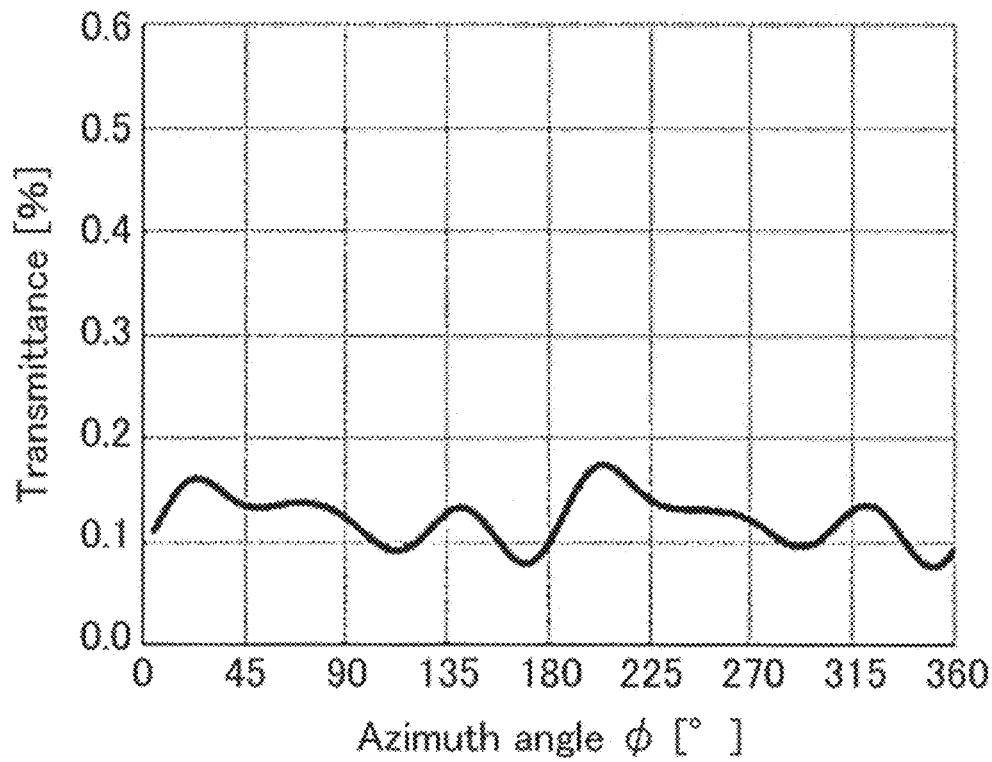
FIG. 23 is a graph of the simulation result of the transmittance in the black display state of the liquid crystal display device of Comparative Embodiment 4-1, showing the transmittance in the black display state at a polar angle of 60° within the azimuth angle range of 0° to 360°.
Figure 24:
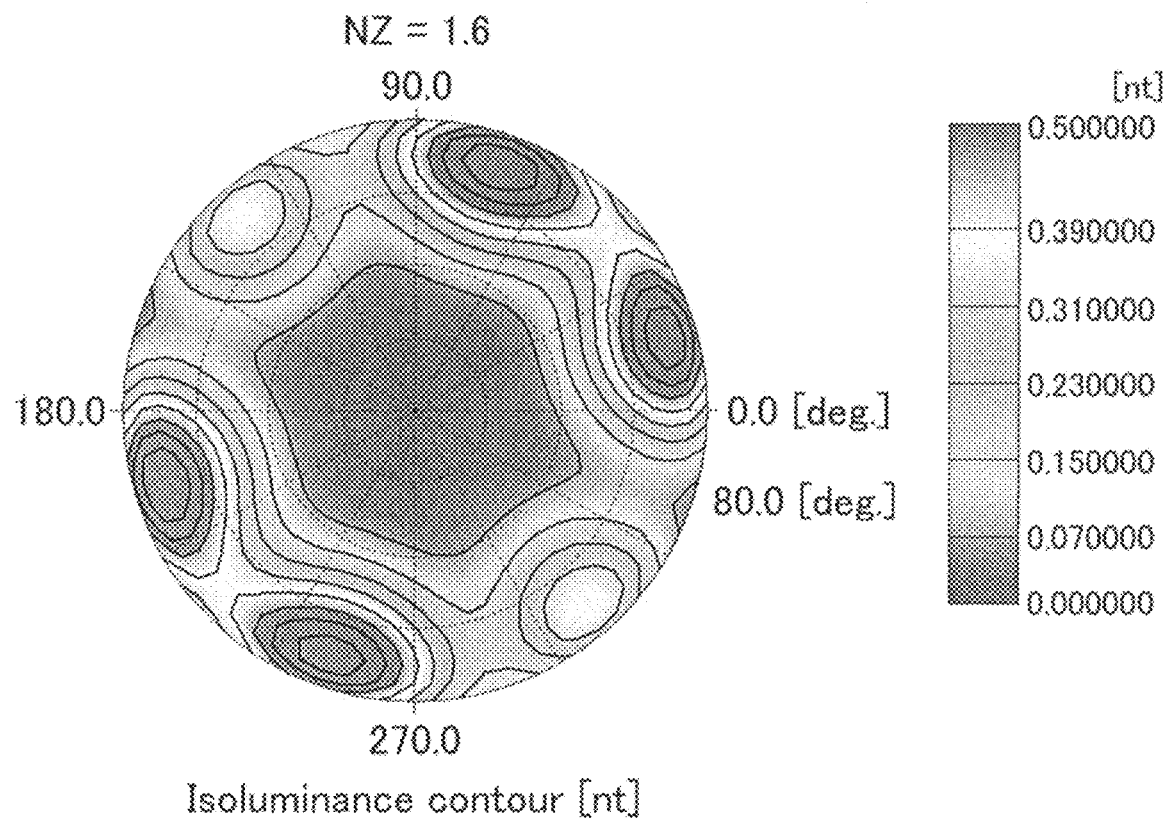
FIG. 24 shows a simulation result of the transmittance in the black display state of a liquid crystal display device of Comparative Embodiment 4-2, illustrating luminance contour lines (black transmittance chart) in the black display state within the azimuth angle range of 0° to 360° and the polar angle range of 0° to 80°.
Figure 25:
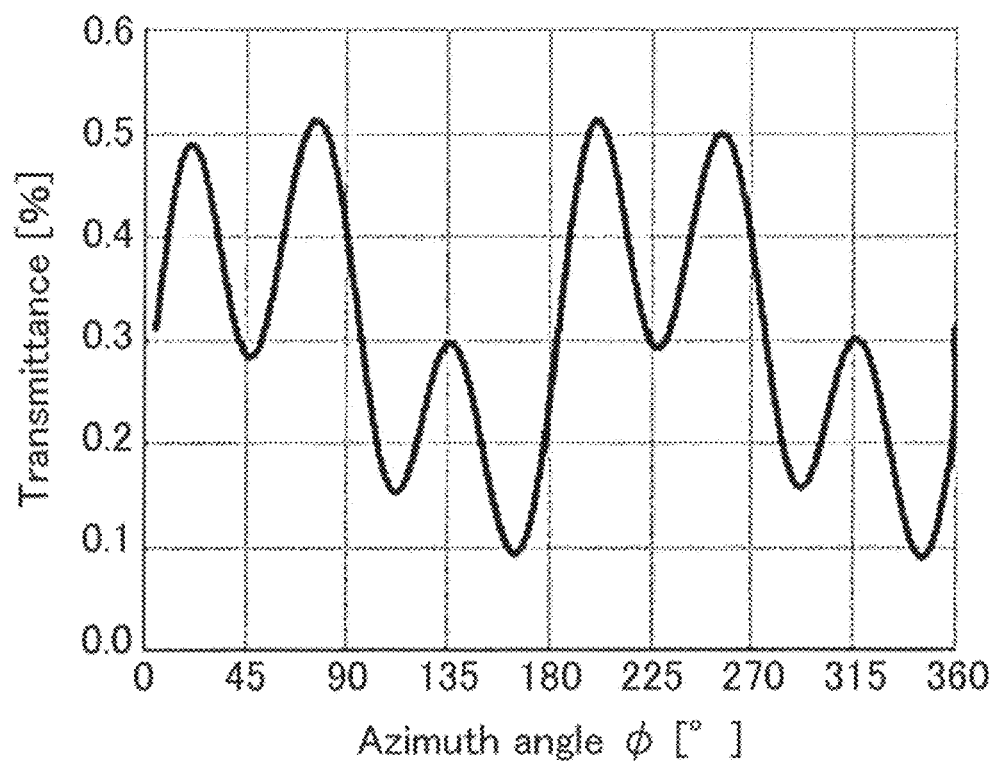
FIG. 25 is a graph of the simulation result of the transmittance in the black display state of the liquid crystal display device of Comparative Embodiment 4-2, showing the transmittance in the black display state at a polar angle of 60° within the azimuth angle range of 0° to 360°.

FIG. 10 is a graph showing the reflectance values of antireflection films of Reference Examples 1-3 and 2-1 and a blue antireflection film. FIG. 11 is a chromaticity diagram showing the reflective chromaticity values of the circularly polarizing plates of Reference Examples 1-3 and 2-1. In a circularly polarizing plate of Reference Example 2-1, in which a blue antireflection film having the reflectance as shown in FIG. 10 was disposed on the viewing surface side of the circularly polarizing plate of Reference Example 1-3, the reflectance and the reflective chromaticity were measured in the same manner as in Reference Example 1-1. As a result, as shown in FIG. 10, the circularly polarizing plate of Reference Example 2-1 including the blue antireflection film could shift the wavelength of light to which the circularly polarizing plate provides the minimum reflectance to the longer wavelength side, compared with the circularly polarizing plate of Reference Example 1-3. As shown in FIG. 11, the circularly polarizing plate of Reference Example 2-1 including the blue antireflection film could provide the reflected color shifted to a blue region from a red region, compared with the circularly polarizing plate of Reference Example 1-3. As described, the circularly polarizing plate of Reference Example 2-1 including the blue antireflection film could reduce the reddishness of the reflected color of the entire circularly polarizing plate, compared with the circularly polarizing plate of Reference Example 1-3.

What is claimed is:

1. A liquid crystal display device comprising in the following order from a viewing surface side:
   a first polarizer;
   an out-cell retardation layer;
   a first substrate;
   an in-cell retardation layer;
   a horizontally aligned liquid crystal layer;
   a second substrate; and
   a second polarizer,
   the liquid crystal display device further comprising a viewing angle compensation film between the first polarizer and the out-cell retardation layer or between the second substrate and the second polarizer,
   the out-cell retardation layer being a laminate including in the following order from a viewing surface side: a first retardation layer having an NZ coefficient of 1.0 or greater and 1.1 or smaller and an in-plane retardation of 120 nm or greater and smaller than 137.5 nm; and a second retardation layer having an in-plane retardation of 0 nm or greater and 10 nm or smaller and a thickness retardation of 80 nm or greater and 150 nm or smaller,
   the in-cell retardation layer being a third retardation layer having an NZ coefficient of 0.7 or greater and 1.4 or smaller and an in-plane retardation of 120 nm or greater and smaller than 137.5 nm,
   wherein the viewing angle compensation film is disposed between the first polarizer and the out-cell retardation layer, and
   the in-plane retardation of the first retardation layer Re(A1), the NZ coefficient of the first retardation layer NZ(A1), and the thickness retardation of the second retardation layer Rth(C1) satisfy a relation expressed by the following Formula 1:

$$P-10 \leq Rth(C1) \leq P+10 \quad \text{(Formula 1)}$$

wherein P satisfies a relation expressed by the following Formula P1:

$$P=Re(A1)-(Re(A1)/NZ(A1)-95)-(120-Re(A1)) \quad \text{(Formula P1)}.$$

2. The liquid crystal display device according to claim 1, wherein the first retardation layer has an in-plane retardation of 135 nm or smaller.

3. The liquid crystal display device according to claim 1, wherein the viewing angle compensation film is a laminate including: a retardation layer having an NZ coefficient of 0.7 or greater and 1.3 or smaller and an in-plane retardation of 130 nm or greater and 150 nm or smaller; and a retardation layer having an in-plane retardation of 0 nm or greater and 10 nm or smaller and a thickness retardation of 80 nm or greater and 100 nm or smaller.

4. The liquid crystal display device according to claim 1, wherein the liquid crystal display device further comprises an antireflection film on a viewing surface side of the first polarizer, and
   the antireflection film has a minimum visible light reflectance within a wavelength range of 550 nm or greater and 780 nm or smaller.

5. A liquid crystal display device comprising in the following order from a viewing surface side:
   a first polarizer;
   an out-cell retardation layer;
   a first substrate;
   an in-cell retardation layer;
   a horizontally aligned liquid crystal layer;
   a second substrate; and
   a second polarizer,
   the liquid crystal display device further comprising a viewing angle compensation film between the first polarizer and the out-cell retardation layer or between the second substrate and the second polarizer,
   the out-cell retardation layer being a laminate including in the following order from a viewing surface side: a first retardation layer having an NZ coefficient of 1.0 or greater and 1.1 or smaller and an in-plane retardation of 120 nm or greater and smaller than 137.5 nm; and a second retardation layer having an in-plane retardation of 0 nm or greater and 10 nm or smaller and a thickness retardation of 80 nm or greater and 150 nm or smaller,
   the in-cell retardation layer being a third retardation layer having an NZ coefficient of 0.7 or greater and 1.4 or smaller and an in-plane retardation of 120 nm or greater and smaller than 137.5 nm,
   wherein the viewing angle compensation film is disposed between the second substrate and the second polarizer, and
   the in-plane retardation of the first retardation layer Re(A1), the NZ coefficient of the first retardation layer NZ(A1), and the thickness retardation of the second retardation layer Rth(C1) satisfy a relation expressed by the following Formula 2:

$$Q-10 \leq Rth(C1) \leq Q+10 \quad \text{(Formula 2)}$$

wherein Q satisfies a relation expressed by the following Formula Q1:

$$Q=Re(A1)-(Re(A1)/NZ(A1)-100)-(120-Re(A1)) \times (NZ(A1)-1.0) \times 100 \quad \text{(Formula Q1)}.$$

6. The liquid crystal display device according to claim 5, wherein the first retardation layer has an in-plane retardation of 135 nm or smaller.

7. The liquid crystal display device according to claim 5, wherein the viewing angle compensation film is a laminate including: a retardation layer having an NZ coefficient of 0.7 or greater and 1.3 or smaller and an in-plane retardation of 130 nm or greater and 150 nm or smaller; and a retardation layer having an in-plane retardation of 0 nm or greater and 10 nm or smaller and a thickness retardation of 80 nm or greater and 100 nm or smaller.

8. The liquid crystal display device according to claim 5, wherein the liquid crystal display device further comprises an antireflection film on a viewing surface side of the first polarizer, and the antireflection film has a minimum visible light reflectance within a wavelength range of 550 nm or greater and 780 nm or smaller.

* * * * *